(12) United States Patent
Woodgate et al.

(10) Patent No.: US 7,796,318 B2
(45) Date of Patent: Sep. 14, 2010

(54) DIRECTIONAL DISPLAY APPARATUS

(75) Inventors: Graham John Woodgate, Oxfordshire (GB); Jonathan Harrold, Warwickshire (GB)

(73) Assignee: AU Optronics Corp., Hsinchu (TW)

( * ) Notice: Subject to any disclaimer, the term of this patent is extended or adjusted under 35 U.S.C. 154(b) by 57 days.

(21) Appl. No.: 12/128,064

(22) Filed: May 28, 2008

(65) Prior Publication Data

US 2008/0273242 A1 Nov. 6, 2008

Related U.S. Application Data

(63) Continuation of application No. 10/573,649, filed as application No. PCT/GB2004/004086 on Sep. 24, 2006, now Pat. No. 7,423,796.

(30) Foreign Application Priority Data

Sep. 30, 2003 (GB) ................................. 0322902.8

(51) Int. Cl.
*G02F 1/00* (2006.01)
*G09G 3/00* (2006.01)
*H04N 15/00* (2006.01)

(52) U.S. Cl. ........................... 359/237; 345/32; 348/42

(58) Field of Classification Search ................. 359/237, 359/245, 248, 254, 463, 462, 455, 494, 642, 359/733, 622, 624; 345/32, 33, 204, 419; 348/40, 41, 42, 51; 396/324; 349/15
See application file for complete search history.

(56) References Cited

U.S. PATENT DOCUMENTS 4,959,641 A 9/1990 Bass et al.

(Continued)

FOREIGN PATENT DOCUMENTS

EP 0 726 482 8/1996

(Continued)

OTHER PUBLICATIONS

Berkel, C.V., et al,; "Multiview 3D-LCD;" Proc. of SPIE, vol. 2653, 1996, pp. 32-39.

(Continued)

*Primary Examiner*—Ricky L Mack
*Assistant Examiner*—Tuyen Q Tra
(74) *Attorney, Agent, or Firm*—Thomas, Kayden, Horstemeyer & Risley, LLP

(57) ABSTRACT

A directional display apparatus, comprising a spatial light modulator comprising an array of pixels and a lens array in which each respective section of the lens array is capable of directing light from a group of pixels aligned with the respective section into nominal viewing windows, is arranged such that each respective section is also capable of directing light from at least one adjacent group of pixels aligned with a section adjacent the respective section into the same nominal viewing windows. This may be achieved by a deflection element, such as a prism element or a hologram, or by each respective section of the lens array having at least one lens surface providing: at least one first region capable of directing light from said group of pixels aligned with the respective section into said nominal viewing windows; and at least one second region capable of directing light from said at least one adjacent group of pixels into the same nominal viewing windows. By mixing light from adjacent groups of pixels, striped visual artefacts are reduced.

10 Claims, 17 Drawing Sheets

U.S. PATENT DOCUMENTS

| | | | |
|---|---|---|---|
| 6,069,650 | A | 5/2000 | Battersby |
| 6,414,794 | B1 | 7/2002 | Rosenthal |
| 2003/0067460 | A1 | 4/2003 | Tomono |
| 2003/0161040 | A1 | 8/2003 | Ishii et al. |

FOREIGN PATENT DOCUMENTS

| | | |
|---|---|---|
| EP | 0 829 744 | 3/1998 |
| EP | 0 833 183 | 4/1998 |
| GB | 2 307 058 | 5/1997 |
| WO | WO 98/21620 | 5/1998 |
| WO | WO 03/015424 | 2/2003 |

OTHER PUBLICATIONS

Eichenlaub, J.B.; "Developments in Autostereoscopic Technology at Dimension Technologies Inc.;" Proc. of SPIE, vol. 1915, 1993, pp. 177-186.

Lg Commander, et al.; "Electrode Designs for Tunable Microlenses;" Micolens Arrays, EOS Topical Meeting, 1997, Vo. 13, pp. 48-58.

Mannos, J.L., et al.; "The Effects of a Visual Fidelity Criterion on the Encoding of Images;" IEEE Transactions on Information Theory, 1974, vol. 20, No. 4, pp. 525-535.

Okoshi, T.; "Three-Dimensional Imaging Techniques;" Academic Press, 1976.

Suyama, S., et al.; "3-D Display System with Dual-Frequency Liquid-Crystal Varifocal Lens;" SID 97 Digest, pp. 273-276.

Woodgate, et al., Non-Final Office Action mailed Sep. 21, 2007, filing date Mar. 28, 2006, U.S. Appl. No. 10/573,649.

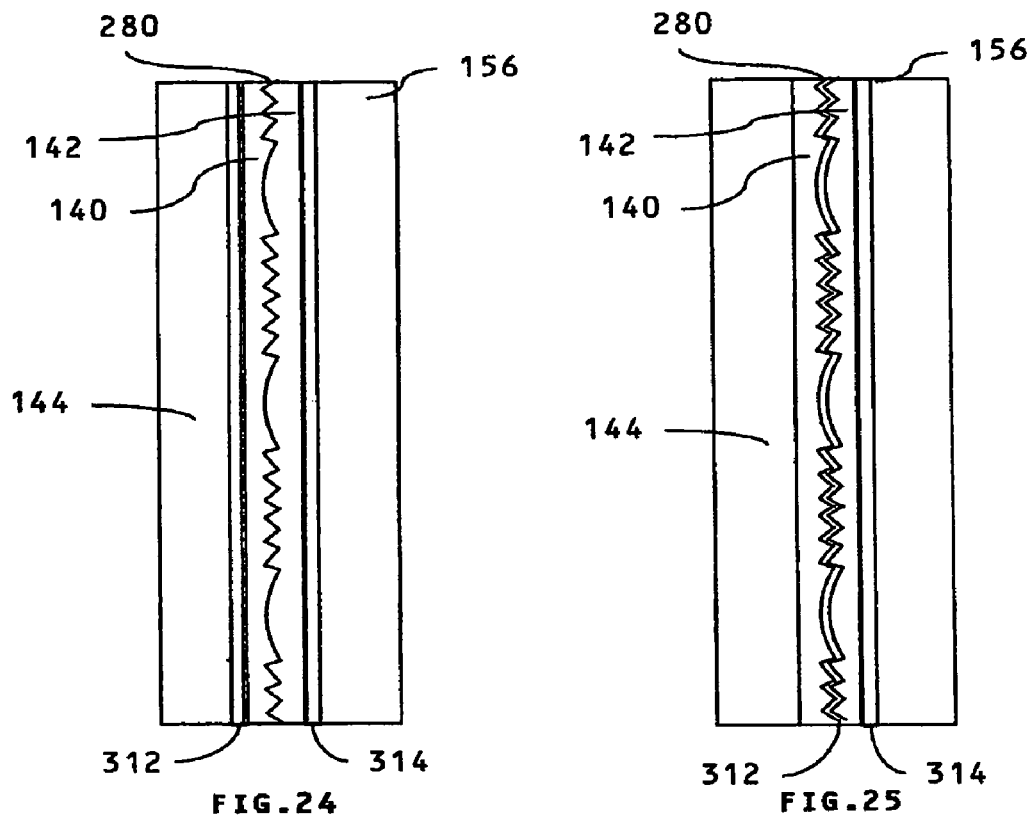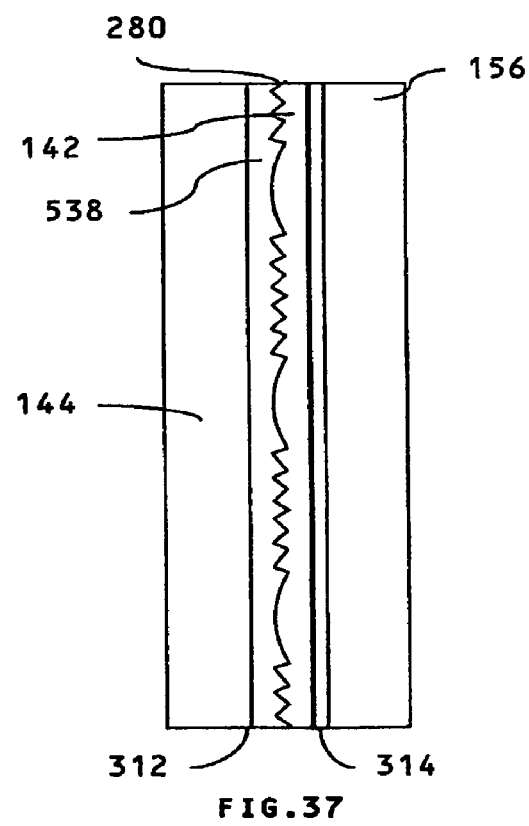

DIRECTIONAL DISPLAY APPARATUS

This application is a continuation of U.S. patent application Ser. No. 10/573,649 filed Mar. 28, 2006, which issued as U.S. Pat. No. 7,423,796, on Sep. 9, 2008, which was a National Stage application of PCT/GB04/004086, filed Sep. 24, 2006, which claimed the benefit of United Kingdom application Serial No. 0322902.8, filed Sep. 30, 2003, the subject matter of which is incorporated herein by reference.

The present invention relates to a directional display apparatus. Such an apparatus may be used as a switchable two dimensional (2D)/three dimensional (3D) autostereoscopic display apparatus; for a switchable high brightness reflective display apparatus; for a multi-user display apparatus; or for a directional lighting apparatus. Such display apparatuses may be used in computer monitors, telecommunications handsets, digital cameras, laptop and desktop computers, games apparatuses, automotive and other mobile display applications.

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observers interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane 42 of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 5 shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4 shows the ideal viewing windows while FIG. 5 is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

A type of parallax optic well known in the art for use in stereoscopic displays is called the lenticular screen, which is an array of vertically extended cylindrical microlenses. The term "cylindrical" as used herein has its normal meaning in the art and includes not only strictly spherical lens shapes but also aspherical lens shapes. The curvature of the lenses is set substantially so as to produce an image of the LCD pixels at the window plane. As the lenses collect the light in a cone from the pixel and distribute it to the windows, lenticular displays have the full brightness of the base panel.

FIG. 6 shows the structure of a prior art lenticular display device. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68, 71, 74, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82. The light then passes through a lenticular screen substrate 94 and a lenticular screen 96 which is formed on the surface of the lenticular screen substrate 94. The lenticular screen 96 serves to direct light from alternate pixel columns 69,71,73,75 to the right eye as shown by the ray 88 from the pixel 69 and from the intermediate columns 68,70,72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

In the above arrangement the LCD pixel plane 74 acts as a spatial light modulator. As used in this document, the term spatial light modulator (SLM) relates to addressable, adjustable devices including both light valve devices such as liquid crystal displays and emissive devices such as electroluminescent displays and LED displays.

The pixels of the display are arranged as rows and columns separated by gaps, (generally defined by the black mask in a liquid crystal display, LCD) with the lenticular screen being an array of vertically extended lenses of pitch close to twice the pitch of the pixel columns. The lenticular screen directs the light from each pixel column into respective nominal viewing windows at a region in front of the display. The angles of the output cone from the display are determined by the width and shape of the pixel aperture and the alignment and aberrations of the lenticular screen.

In order to steer the light from each pixel to the viewing window, the pitch of the lenticular screen is slightly smaller than twice the pitch of the pixel array. This condition is known as 'viewpoint correction'. In such a display, the resolution of each of the stereo pair images is half the horizontal resolution of the base LCD, and two views are created.

Thus, the light from the odd columns of pixels 68,70,72,74 can be seen from the left viewing window, and the light from the even columns of pixels 69,71,73,75 can be seen from the right viewing window. If the left eye image data is placed on the odd columns of the display and the right eye image data on the even columns then the observer in the correct 'orthoscopic' position should fuse the two images to see an autostereoscopic 3D image across the whole of the display.

There will be light leakage between the two views such that some of the left eye view will be seen by the right eye and vice versa. This leakage is termed image cross-talk. Cross talk is an important mechanism for generating visual strain when viewing 3D displays, and its control is a major driver in 3D display development. For flat panel autostereoscopic displays (in particular those based on LCD technology), the limitation to window performance is generally determined by the shape and aperture ratio of the pixel and the quality of the optical element.

In a lenticular screen type display, the columns directly under the slits are imaged to a first pair of windows in the zeroeth lobe of the display. The adjacent pixel columns are also imaged to viewing windows, in +1 and −1 lobes of the display. Thus as can be seen in FIG. 3, if the user moves laterally outside the orthoscopic zone then light from the incorrect image will be sent to each eye. When the right eye sees the left eye view and vice versa, the image is termed 'pseudoscopic', compared to the correct orthoscopic condition.

In order to increase the lateral viewing freedom of the display, more than two pixel columns can be placed under each lens. For example, four columns will create four windows in which the view is changed for each window. Such a display will give a look-around appearance as the observer moves. The longitudinal freedom is also increased by such a method. However, in this case, the resolution of the display is limited to one quarter of the resolution of the base panel.

Lenticular screens are not readily removed and replaced due to the requirements of sub-pixel alignment tolerances of the barrier with respect to the pixel structure of the display in order to optimise the viewing freedom of the display. The 2D mode is half resolution.

Lenticular displays are described in T. Okoshi "Three Dimensional Imaging Techniques", Academic Press, 1976. One type of lenticular display using a spatial light modulator is described in U.S. Pat. No. 4,959,641 which describes non-switching lenticular elements in air.

A lenticular display using cylindrical lenses that are tilted with respect to columns of pixels of a display is described in "Multiview 3D—LCD" published in SPIE Proceedings Vol. 2653, 1996, pages 32 to 39.

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artefact free 2D mode.

One type of display in which the effect of the parallax optic is removed is disclosed in Proc. SPIE vol. 1915 Stereoscopic Displays and Applications IV (1993) pp 177-186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diffuser is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artefacts in the 3D mode, as well as from unwanted residual scatter in the diffuser's clear state which will increase the display cross-talk. Therefore, such a display is likely to exhibit higher levels of visual strain.

In another type of switchable 2D-3D display disclosed in EP-A-0,833,183, a second LCD is placed in front of the display to serve as a parallax optic. In a first mode, the parallax LCD is clear so that no windows are produced and an image is seen in 2D. In a second mode, the device is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D-3D display disclosed in EP-A-0,829,744, a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20-30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15-16 May 1997 L. G. Commander et al "Electrode designs for tuneable microlenses" pp 48-58.

In another type of switchable 2D-3D display disclosed in U.S. Pat. No. 6,069,650 and WO-98/21620, switchable microlenses comprising a lenticular screen filled with liquid crystal material are used to change the optical power of a lenticular screen. U.S. Pat. No. 6,069,650 and WO-98/21620 teach the use of an electro-optic material in a lenticular screen whose refractive index is switchable by selective application of an electric potential between a first value whereby the light output directing action of the lenticular means is provided and a second value whereby the light output directing action is removed.

A 3D display comprising a liquid crystal Fresnel lens is described in S. Suyama et al "3D Display System with Dual Frequency Liquid Crystal Varifocal Lens", SID 97 DIGEST pp 273-276.

In another type of switchable 2D-3D display described in WO-03/015424, a passive birefringent microlens is switched between a 2D and 3D mode by means of controlling the polarisation of light which passes through the lens and reaches an observer. It is also known from this reference to use twist in passive birefringent lenses in order to rotate the input polarisation such that the birefringent microlens geometric axis is parallel to the birefringent material axis at the lens surface. One display apparatus described in WO-03/015424 is shown in plan view in FIG. 7 and arranged as follows.

A backlight 102 produces illumination 104 of an LCD input polariser 106. The light passes through a thin film transistor (TFT) substrate 108 and is incident on a pixel layer 110 comprising individually controllable phase modulating pixels 112-126. The pixels are arranged in rows and columns and comprise a pixel aperture 128 and may have a separating black mask 130. The light then passes through an LCD counter substrate 132 and a lens carrier substrate 136 upon which is formed a birefringent microlens array 138. The birefringent microlens array 138 comprises an isotropic lens microstructure 140 and an aligned birefringent material 142 with an optical axis direction as marked. The output of the birefringent lens then passes through a lens substrate 144 and a polarisation modifying device 146. Each birefringent lens of the lens array is cylindrical; the lens array 138 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 146 is configured to transmit light with a polarisation state which is parallel to the ordinary axis of the birefringent material of the microlens array. The ordinary refractive index of the material (such as a liquid crystal material) is substantially matched to the index of the isotropic material 140. Thus the lenses have no optical effect and there is substantially no change to the directional distribution of the output of the display. In this mode, an observer will see all the pixels 112-126 of the display with each eye, and a 2D image will be produced.

In a second mode of operation, the polarisation modifying device 146 is configured to transmit light with a polarisation state which is parallel to the extra-ordinary axis of the birefringent microlens array. The extraordinary refractive index of the material (such as a liquid crystal material) is different to the index of the isotropic material 140. Thus the lenses have an optical effect and there is a change to the directional distribution of the output of the display. This directional distribution can be set as well known in the art so as an observer correctly positioned at the front of the display will see a left image in their left eye corresponding to light from left image pixels 112,116,120,124 and in their right eye will see a right image corresponding to right image pixels 114,118,122,126. In this way, a switchable 2D to 3D autostereoscopic display can be produced.

Lens arrays are particularly suitable for autostereoscopic displays because they combine the properties of high optical efficiency, small spot size and ability to be manufactured using well known lithographic processing techniques.

FIG. 8 shows another embodiment of the polarisation activated microlenses in which the backlight and input polarisers are not shown. The polarization modifying device 146 of FIG.

7 is replaced by an electrically controlled polarisation switch comprising additional ITO layers 158 and 158 sandwiching a liquid crystal layer 160, an output substrate 164 and an output polariser 166. An electrical signal controller 162 allows switching of the electric field between the ITO electrodes to allow the liquid crystal material 160 to switch. This allows control of the polarisation state transmitted through the output polariser 166, and thus the function of the lens, as described previously.

FIG. 9 shows a similar device to that in FIG. 8, but an output polariser 154 is placed on the counter substrate 132, and the ITO electrodes and LC layer 158,160 are placed between the lens 142, 144 and the polariser 154. Such a configuration allows switching of the lens with full image contrast and brightness.

Figure 1A:
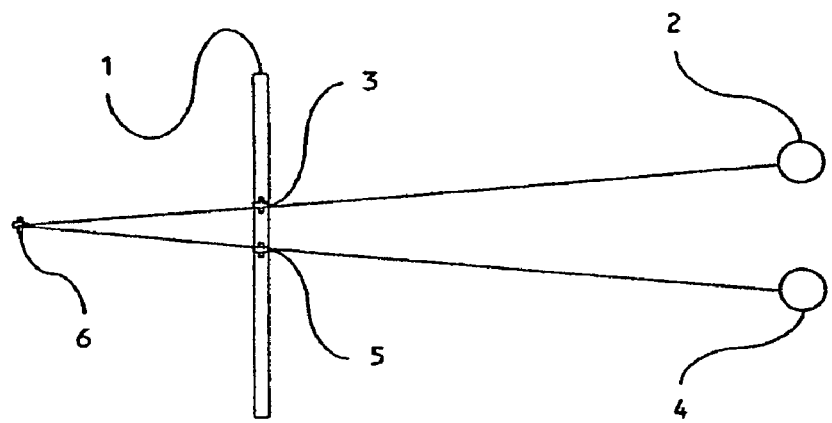

It is known to provide electrically switchable birefringent lenses for purposes of switching light directionally. It is known to use such lenses to switch a display between a 2D mode of operation and a 3D mode of operation.

According to a first aspect of the present invention, there is provided a directional display apparatus comprising:

a spatial light modulator comprising an array of pixels; and a lens array having a structure which repeats at a predetermined pitch, wherein the directional display apparatus is arranged such that, in respect of sections of the lens array at said predetermined pitch, each respective section is capable of directing light from at least one pixel aligned with the respective section into at least one nominal viewing window, and each respective section is also capable of directing light from at least one adjacent pixel aligned with a section adjacent the respective section into the same at least one nominal viewing window.

Spatially multiplexed directional displays such as lenticular displays serve to reduce the lateral luminance resolution of images in the directional mode of operation. The reduction of luminance resolution increases the visibility of individual colour sub-pixels. As the luminance of the green pixels is higher than the red and blue pixels, then the sub-structure of the pixel luminance distribution becomes apparent and the image starts to appear stripy. The lens arrays of the present invention collect light from adjacent groups of pixels, typically adjacent colour sub-pixels, so that colours are mixed across the aperture of each lens. It is thus an advantage of the present invention that light from adjacent colour sub-pixels directed to a first viewing window is mixed so that the luminance fluctuations on the display are reduced and artefacts making the image appear stripy are reduced.

Advantageously, the directional display apparatus is arranged such that each respective section is also capable of directing light from adjacent groups of pixels aligned with sections adjacent the respective section on opposite sides of said respective section into the same nominal viewing windows.

In one type of embodiment, the lens array itself is arranged such that each respective section is capable of said directing of light from said at least one adjacent group of pixels into said same nominal viewing windows. For example, this may be achieved by each respective section of the lens array having at least one lens surface providing: at least one first region capable of directing light from said group of pixels aligned with the respective section into said nominal viewing windows; and at least one second region capable of directing light from said at least one adjacent group of pixels into the same nominal viewing windows.

Similarly, according to a second aspect of the present invention, there is provided a directional display apparatus comprising:

a spatial light modulator comprising an array of pixels; and a lens array having a structure which repeats at a predetermined pitch, wherein the lens array is arranged such that, in respect of sections of the lens array at said predetermined pitch, each respective section is formed to provide:

at least one first region capable of directing light from at least one pixel aligned with the respective section into at least one nominal viewing window; and at least one second region capable of directing light from at least one adjacent pixel aligned with a section adjacent the respective section into the same at least one nominal viewing window.

Such a directional display apparatus has the advantage of allowing the thickness of the lens array to be reduced as compared to a lens array in which the entire lens directs light from the aligned pixels into the nominal viewing windows. This is because the second regions can be inclined in the opposite direction from the first regions. Accordingly, the first portions can be offset from where they would be positioned in a normal lens to reduce the thickness of the lens. This reduction in thickness is comparable to the reduction in thickness achieved in a Fresnel lens in which different regions of the lens are offset to reduce the thickness by providing vertical facets intermediate those offset regions to provide imaging properties similar to a continuous surface. On the other hand, the vertical facets can introduce errors in imaging in a direction off the optical axis. For example, the facets may create cross talk, or may create variations in image intensity for an observer at the window plane which do not correspond to the window intensity structure from the non-facet parts of the lens. In contrast to a Fresnel lens, in the above arrangement of the present invention the offset of the first regions is achieved by the inclination of the second regions, and vice versa, with both first and second regions having desirable imaging properties. Thus the lenses have significantly reduced artefacts. Advantageously this serves to maximise the image quality of the display by reducing image cross-talk, reducing image stripiness and increasing window uniformity.

Birefringent lenses can conveniently be used to switch the function between a 2D mode in which the display has full resolution of the base panel and a directional mode such as an autostereoscopic 3D mode in which the display produces viewing windows. Liquid crystal materials are generally used for birefringent lenses because they offer well controlled optical properties and are compatible with display manufacturing technology.

However, refractive lens arrays such as birefringent lens arrays for autostereoscopic displays have a limited thickness defined by the material choices, and the display geometry. In a typical display, the maximum lens thickness for a singlet lens, or sag, is in the range of 20 to 70 microns. Such thicknesses of liquid crystal material will tend to scatter light. The scattering of light in the lenses is generally undesirable. First, the presence of a scattering layer on the surface of the display will degrade image contrast, particularly in brightly lit environments. This is particularly important for displays to be used in external lighting conditions, such as transflective displays for example. Secondly, in displays such as that illustrated in FIG. 8, the scatter will degrade the contrast of the transmitted image, as the output phase from the birefringent material 142 will be modified prior to the output polariser 166. It is therefore desirable that the amount of scatter from the lens is reduced to maximise image quality. The scatter can be reduced by either reducing the birefringence of the material in the lens or reducing the thickness of the lens. This can be achieved by respectively increasing the sag of the lens or by increasing the material birefringence. It may be desirable to reduce the material birefringence, thus increasing the lens sag.

The above arrangements of the present invention can reduce the scatter from birefringent lenses by reducing the thicknesses of birefringent material in the lenses while maintaining or increasing the sag compared to the equivalent singlet lens.

The use of a birefringent lens advantageously further reduces the material consumption and therefore cost of the lens, while the use of controlled facets allows the optimisation of image quality.

The birefringent lens can advantageously be configured with the isotropic material index substantially the same as the extraordinary index of the birefringent material, so that the material consumption and average liquid crystal layer thickness is further reduced, thus increasing image quality by reducing further the levels of scatter in the lens.

The birefringent lens has a reduced thickness range. A diffractive structure can thus be more conveniently recorded on the lens surface by exposure of an interference pattern on to a photosensitive material formed on the surface of the lens array. The diffractive structure has a pitch set to generate diffractive alignment on the surface. That is, the liquid crystal molecules align with respect to the surface relief structure, which may be generated by diffractive means. It is desirable that the depth of the focus of the interference pattern is as low as possible to allow the formation of high frequency diffraction pattern across it surface. Thus the use of a thinner birefringent lens structure advantageously allows diffractive alignment structures to be formed more readily. The facet angle in order to achieve the desired imaging from adjacent pixels is advantageously tilted so as to allow application of photosensitive medium and recording of interference patterns more readily than vertical facets.

According to a further aspect of the present invention, there is provided a directional display apparatus comprising a lens array arranged to direct light in to a first directional distribution, wherein each lens of the lens array comprises at least two imaging regions, the first imaging region being arranged to image light from a first group of pixels to first viewing windows and the second imaging region being arranged to image light from a second group of pixels to the first viewing windows, the second imaging regions having substantially the same imaging function as the first imaging region of an adjacent lens.

The lens array may be a birefringent lens array arranged to image light in to a first and second directional distribution. In this case, the lens may be a passive lens operating in cooperation with a polarisation switch, or the lens may be an active lens.

In a birefringent lens array, the isotropic refractive index may be substantially the same as the higher or lower of the refractive indices of the birefringent material.

The lens arrays may direct light into viewing windows to provide a number of different effects, for example to provide an autostereoscopic 3D display or a multiviewer display. Thus different types of directional display apparatus in accordance with the present invention can be used for:

an autostereoscopic display means which can conveniently provide a moving full colour 3D stereoscopic image which may be viewed by the unaided eye in a first mode of operation and a full resolution 2D image in a second mode of operation; or a multi-viewer display means which can conveniently provide one 2D image (which may be moving full colour) to one observer and at least a second different 2D image to at least a second observer in one mode of operation and a single fill resolution 2D image seen by all observers in a second mode of operation.

The lens can operate as an active lens in which the orientation of the birefringent material is modified by application of an electric field. Advantageously, the present invention allows the thickness of the birefringent material to be reduced and thus the driving voltage can be reduced.

The materials of the lens may be non-birefringent so that the lens has a permanent function, advantageously reducing the cost of the 3D display.

The structures of the present invention can be applied to the mastering stage of the lenses, rather than the replication stage. Thus, the cost of the individual elements is not substantially affected by the complexity of the lens shape.

The birefringent lens has substantially no visibility in the non-directional mode, irrespective of the structure of the lens. Therefore advantageously the additional lens structures have substantially no additional visibility in the 2D mode of operation.

A separate prism element may be used to generate the deflection of the light rays at the aperture of the lens. Such an arrangement does not require generation of complex lens surfaces.

A hologram element may be used to generate the deflection of the light rays at the aperture of the lens. Such an arrangement does not require generation of complex lens surfaces and does not require a complex alignment of two microstructured surfaces.

Figure 1B:
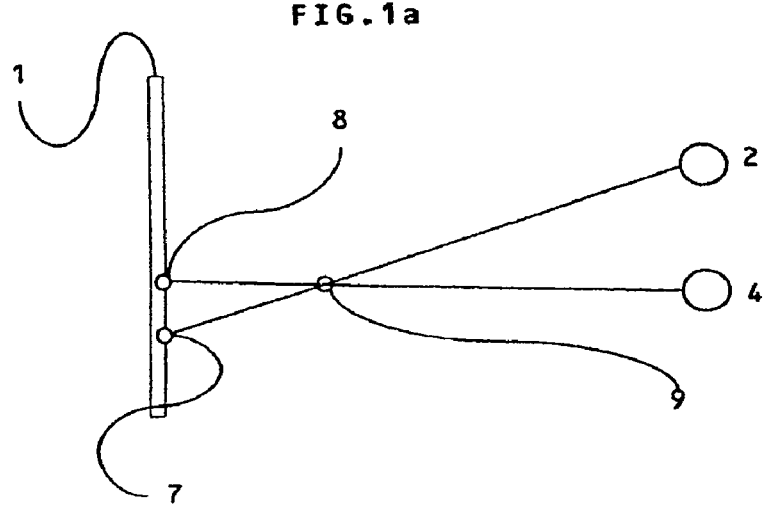
Figure 1C:
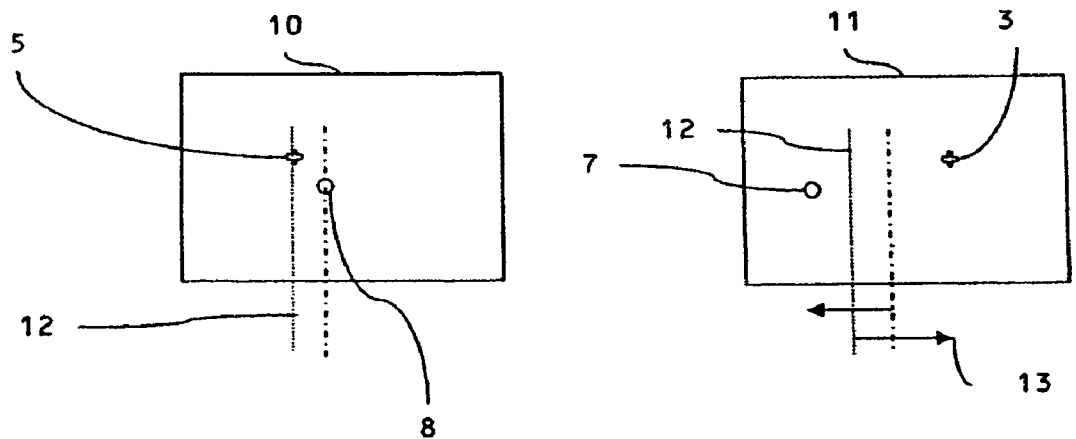
Figure 2A:
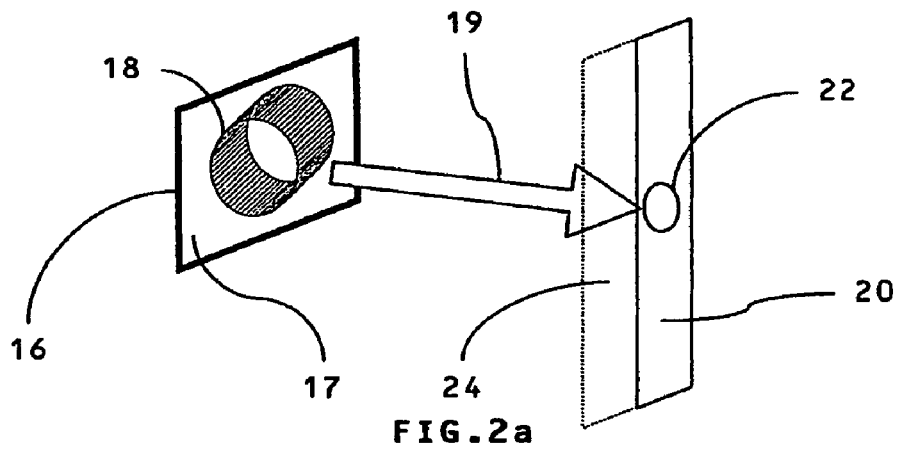
Figure 2B:
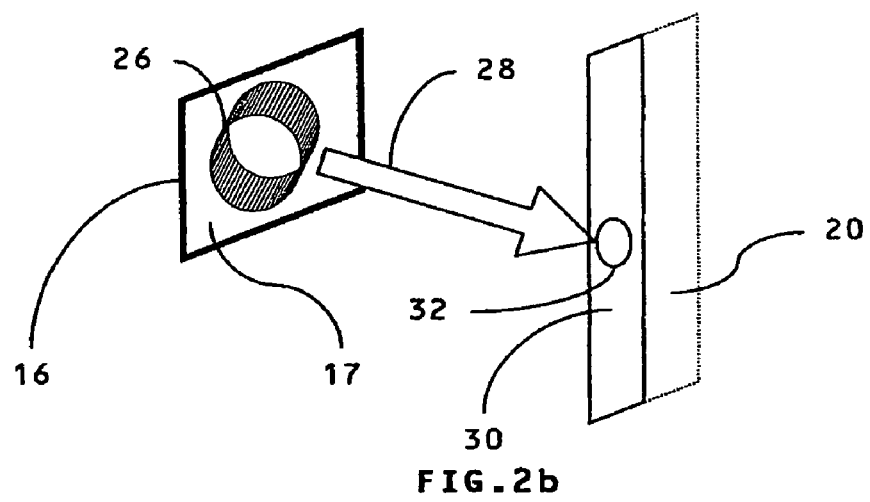
Figure 3:
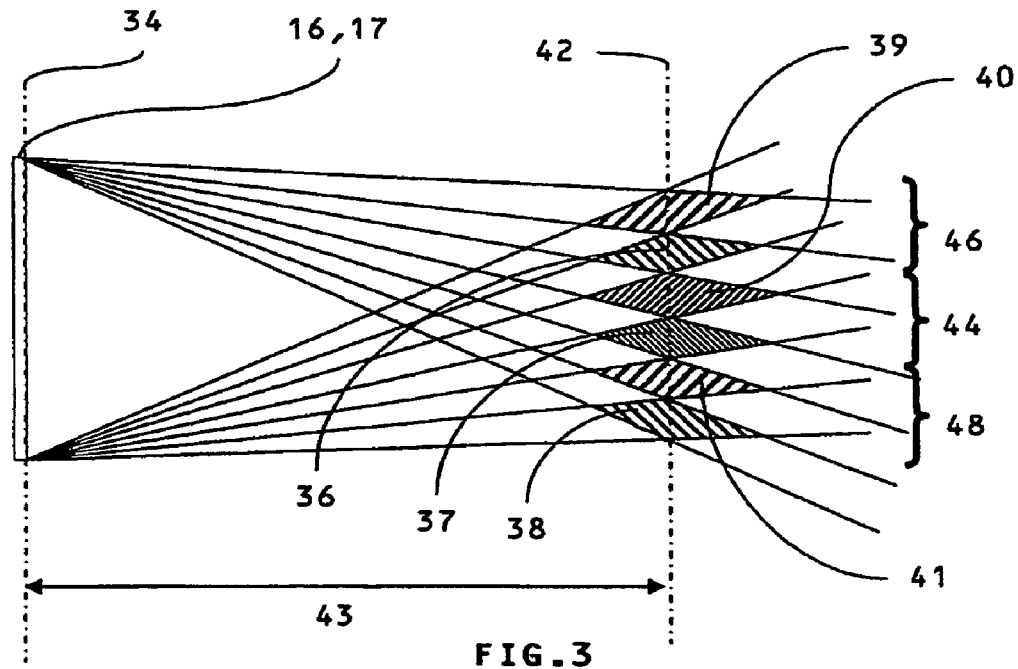
Figure 4:
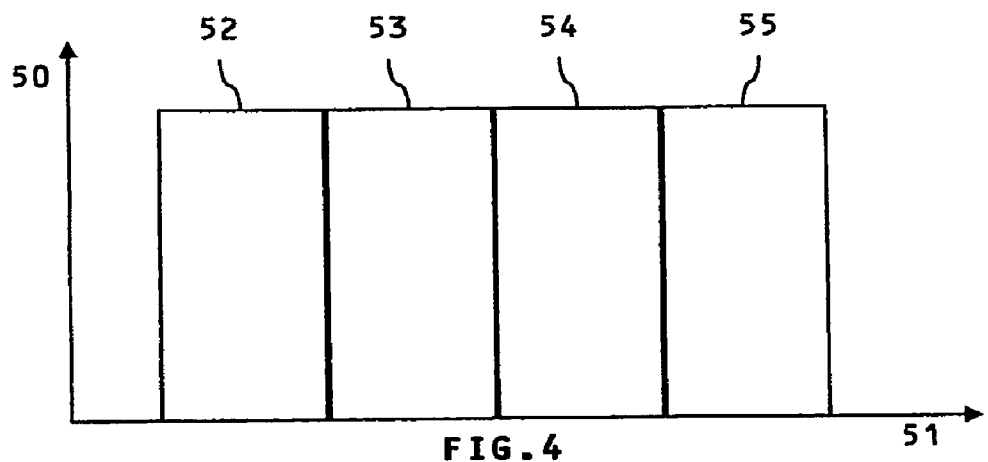
Figure 5:
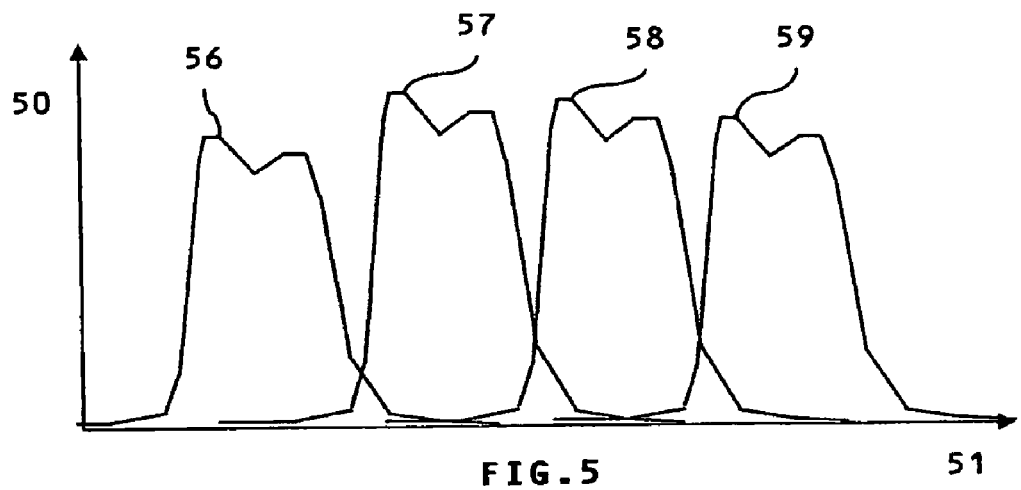
Figure 6:
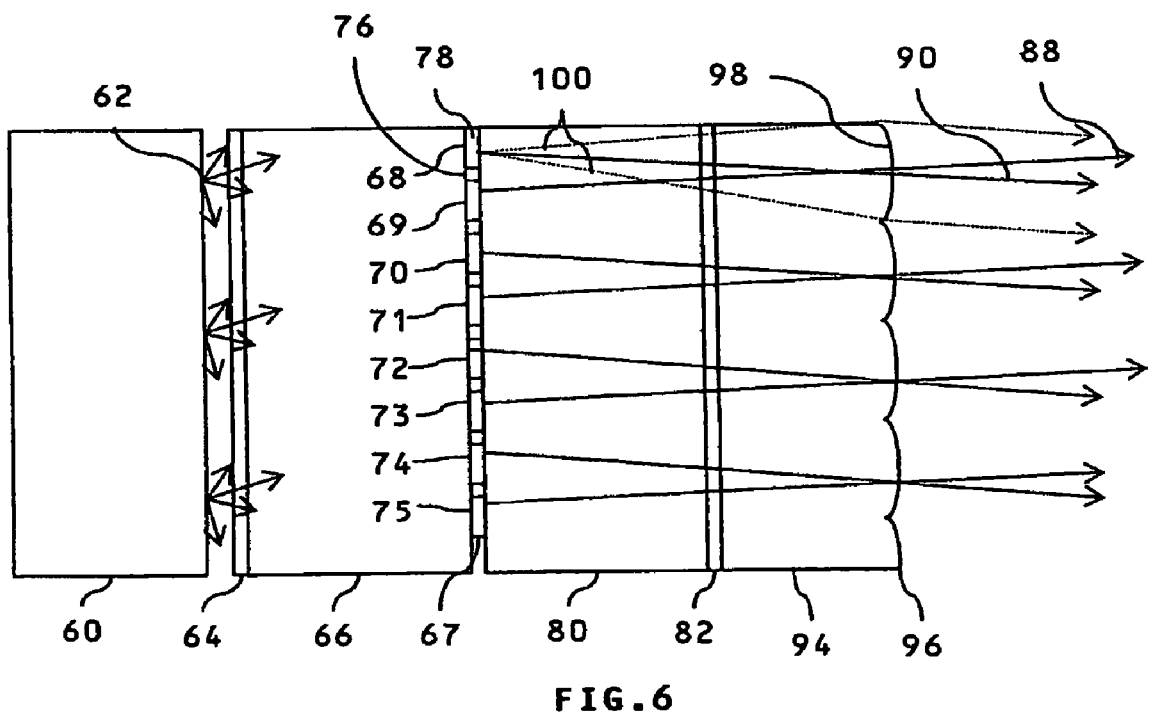
Figure 7:
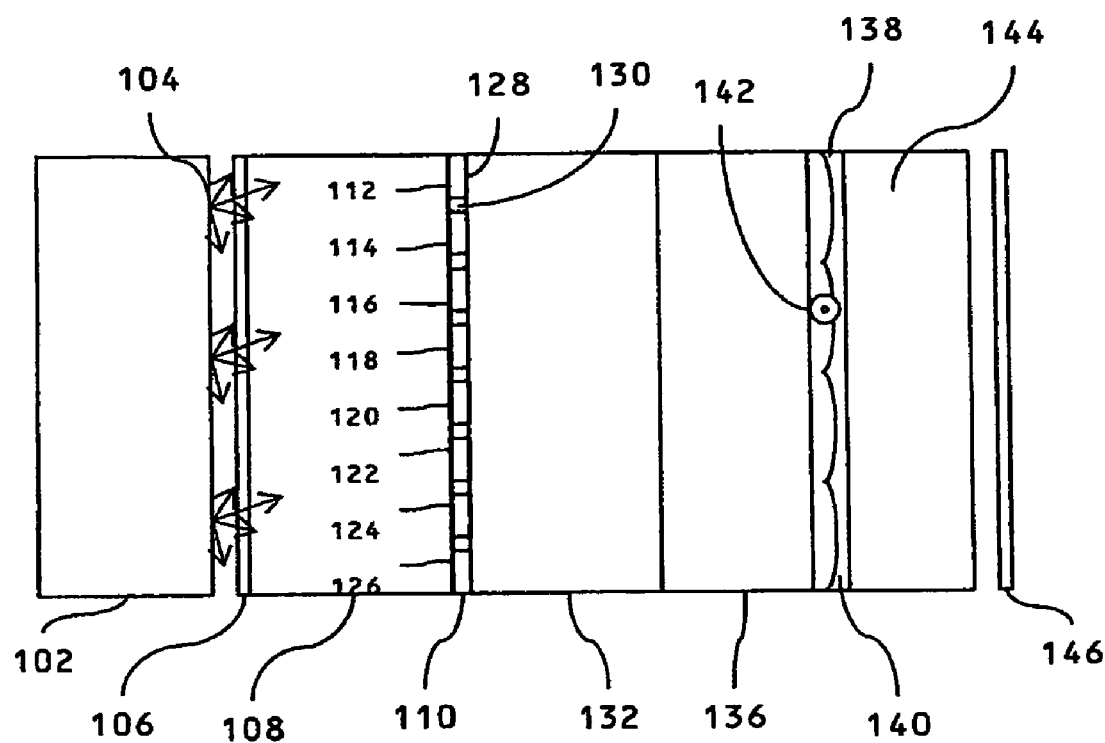
Figure 8:
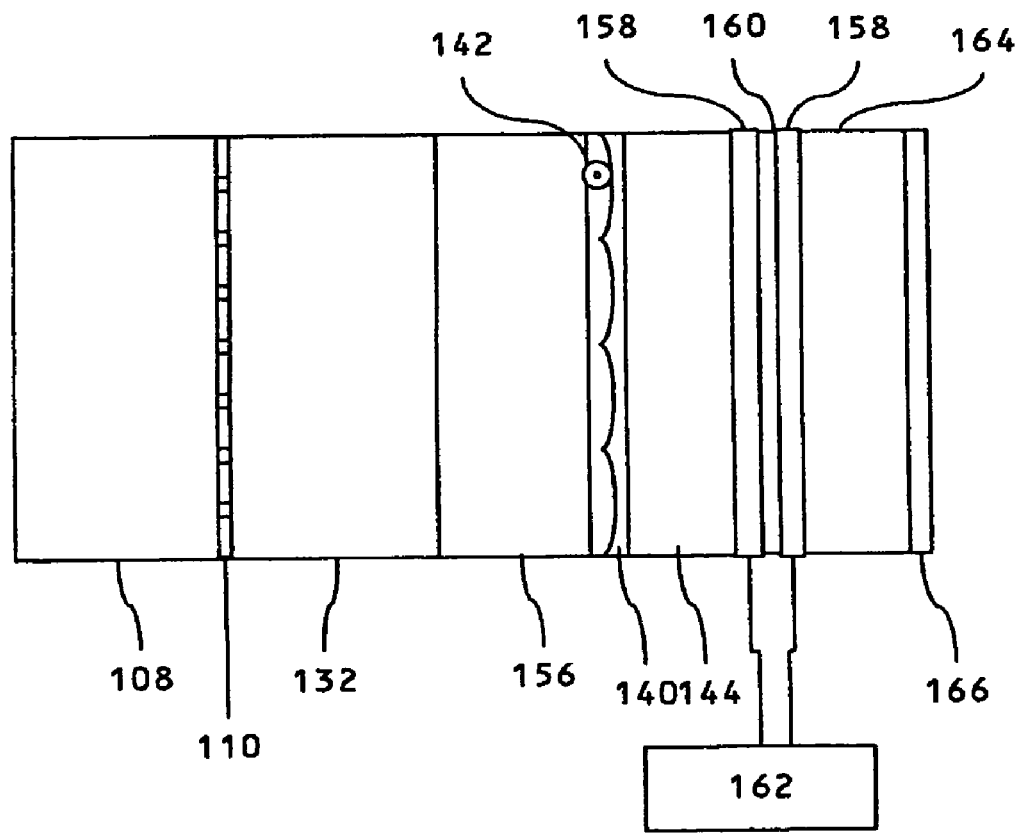
Figure 9:
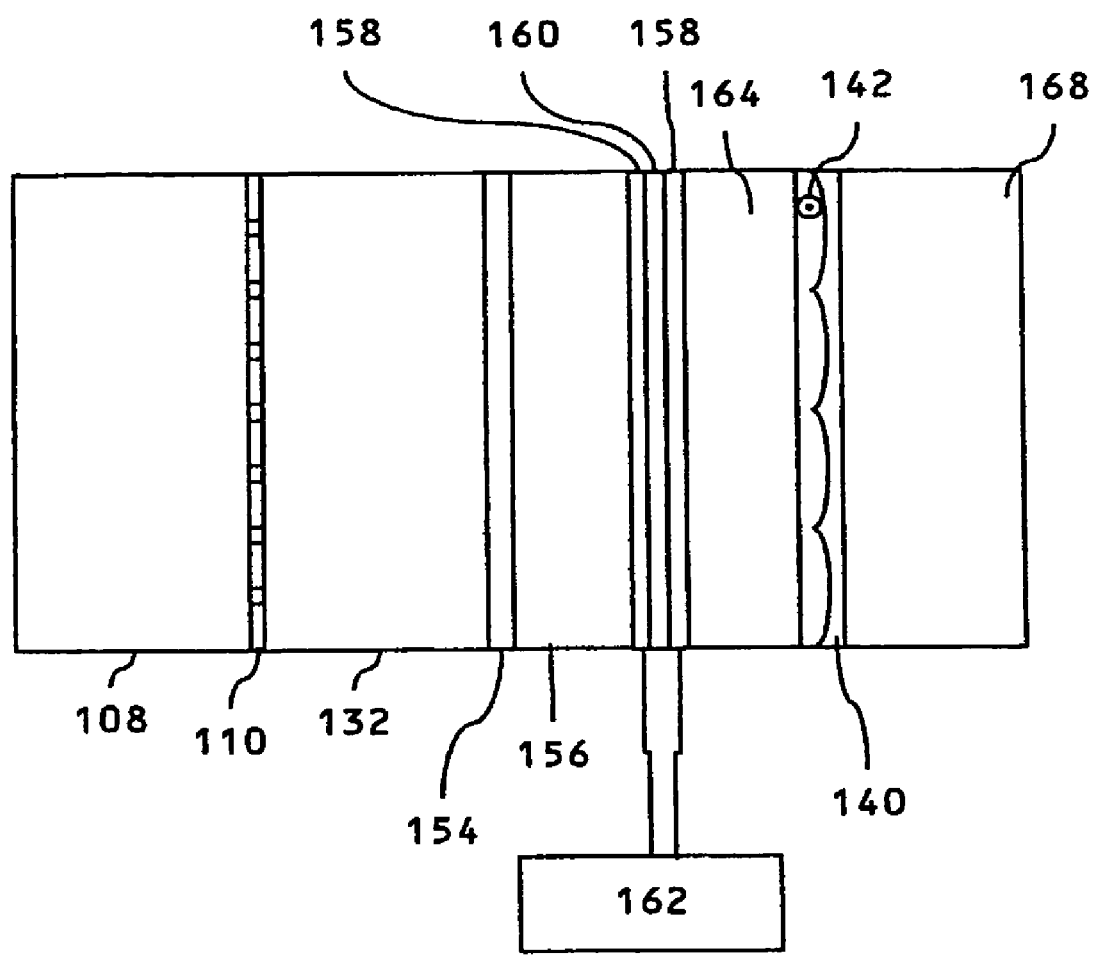
Figure 10:
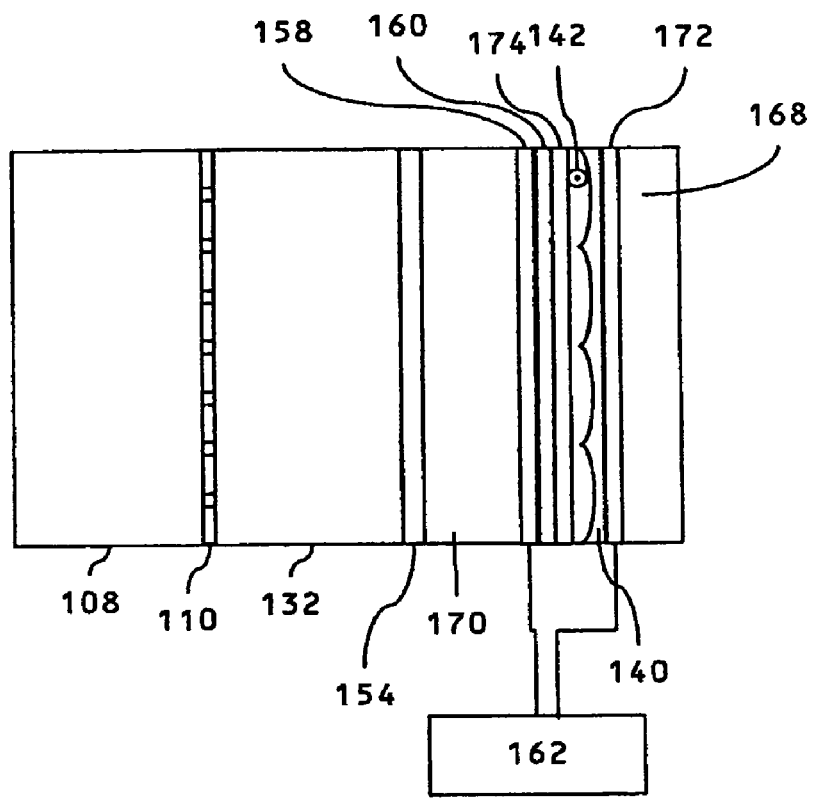
FIG. 10 shows an alternative configuration in which the electrodes and liquid crystal switch 174 are placed in contact with the liquid crystal lens, which may be a solid liquid crystal lens.
Figure 11:
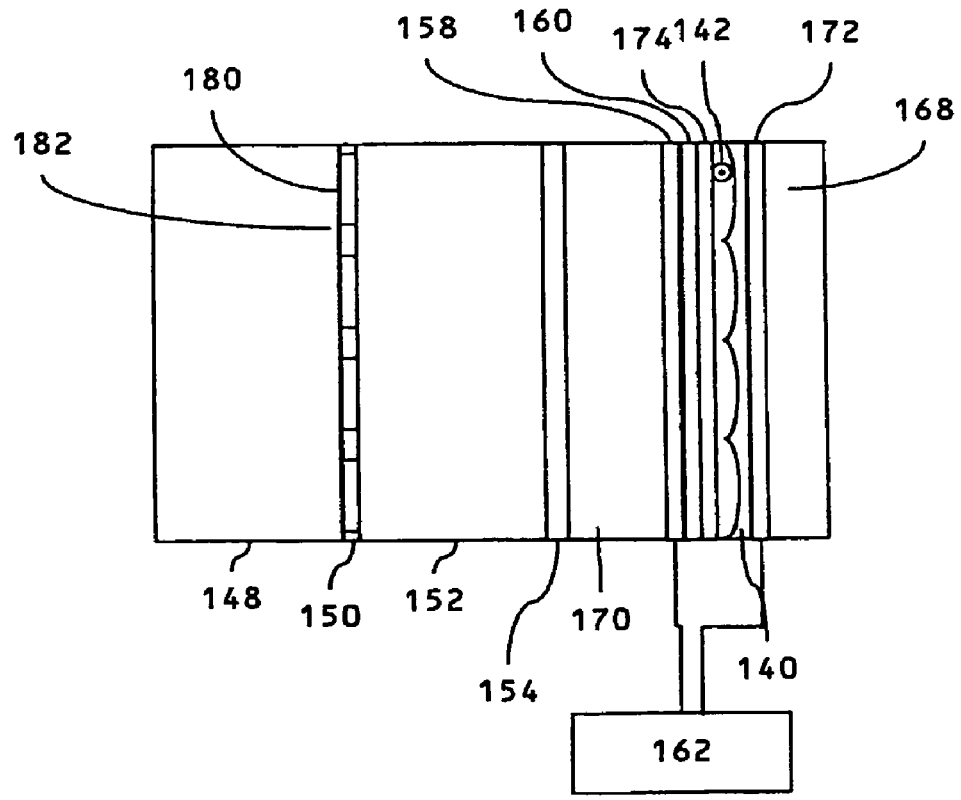
FIG. 11 shows an alternative configuration of the display of FIG. 10, in which the two view pixel columns of an autostereoscopic display are replaced by the apertures of an enhanced brightness display.
Figure 12:
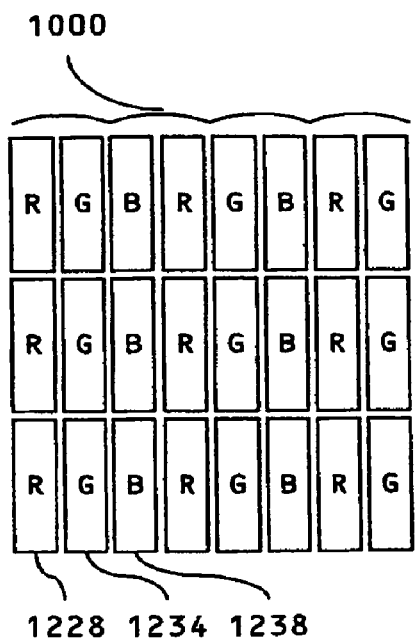
Figure 13:
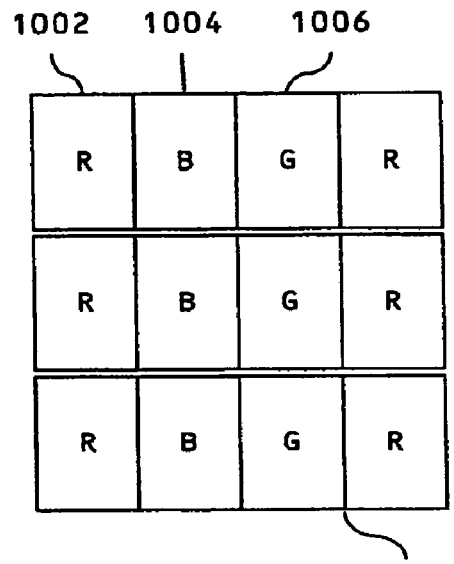
Figure 14:
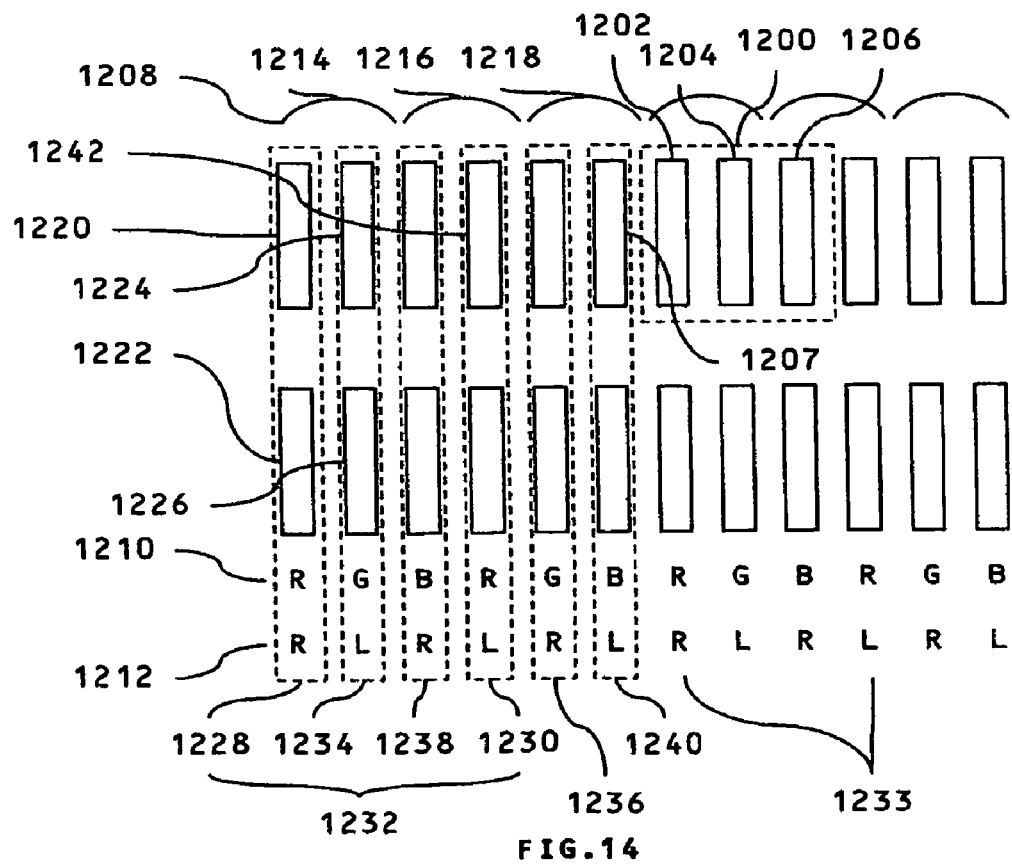
Figure 15:
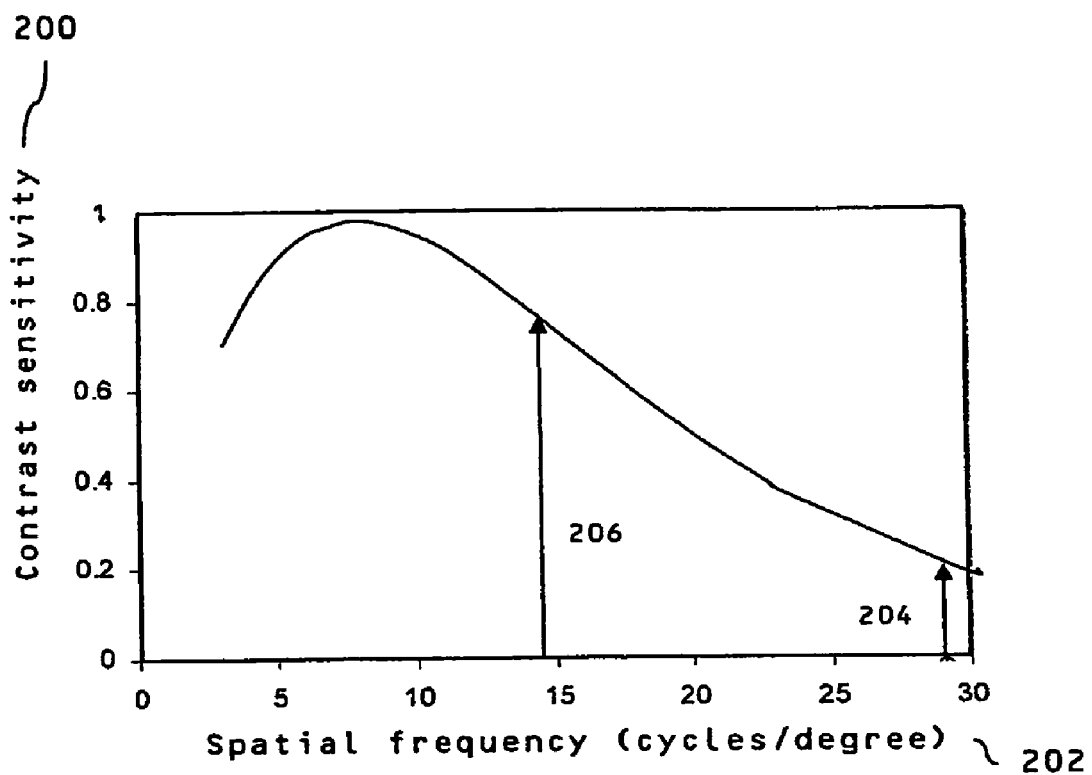
Figure 16:
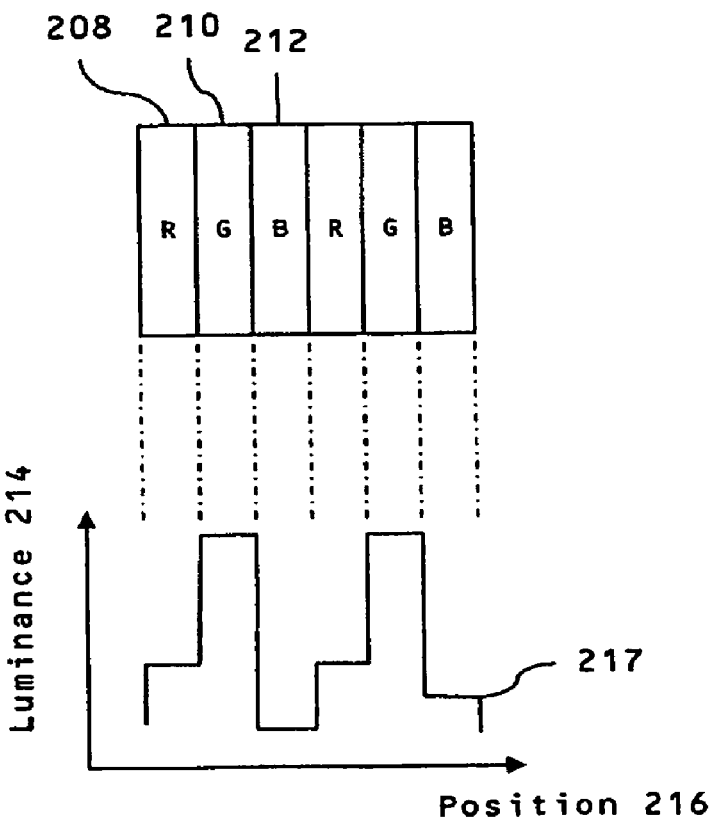
Figure 17:
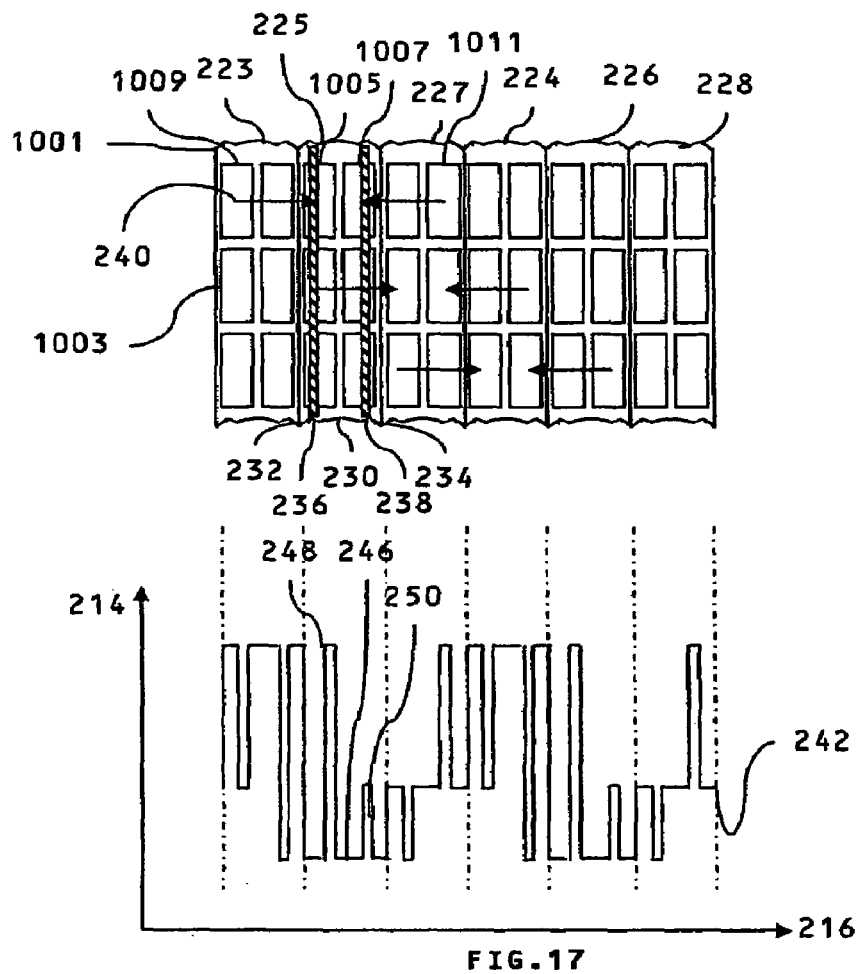
Figure 21:
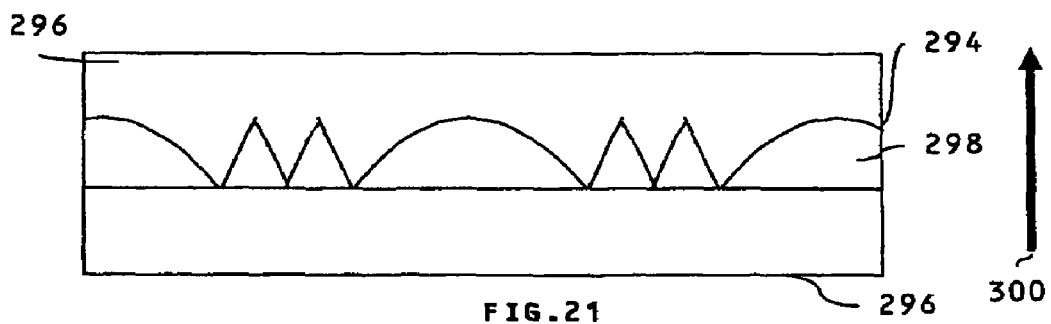
Figure 22:
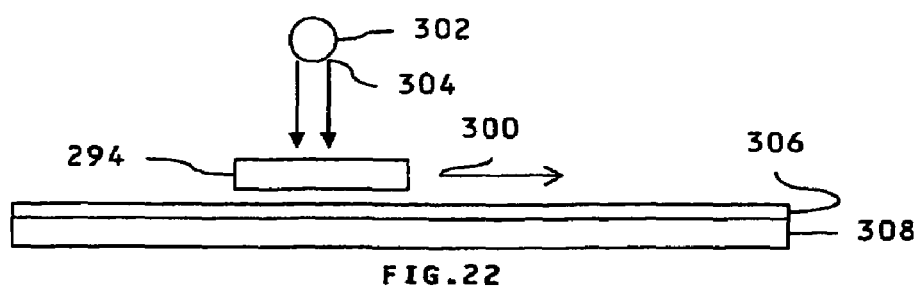
Figure 18:
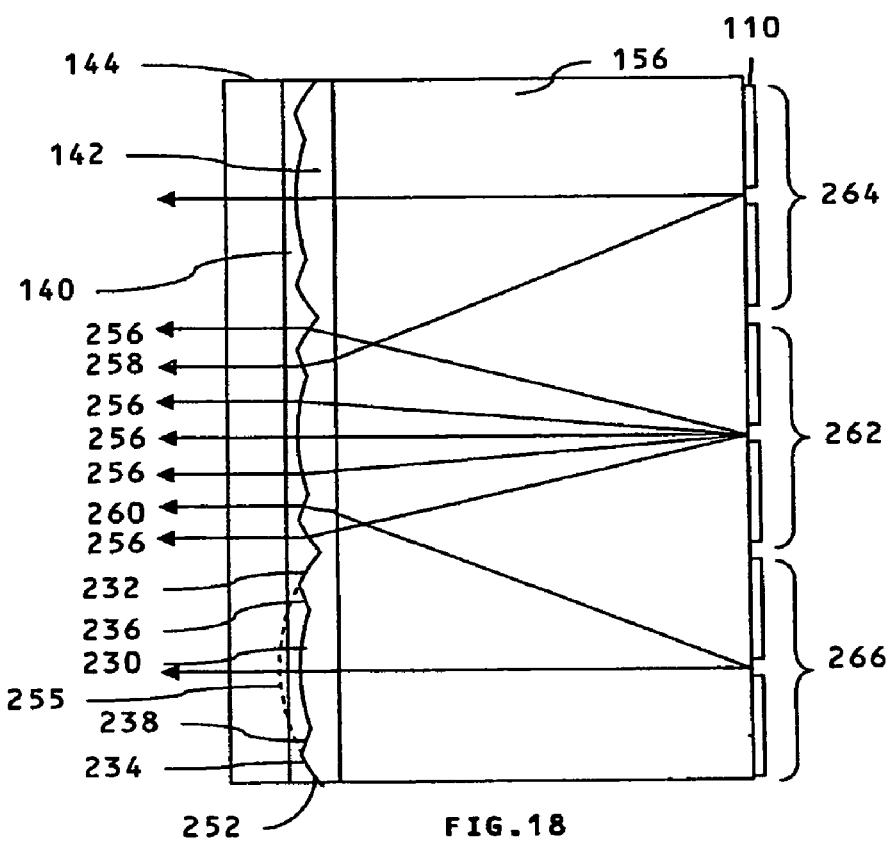
Figure 19:
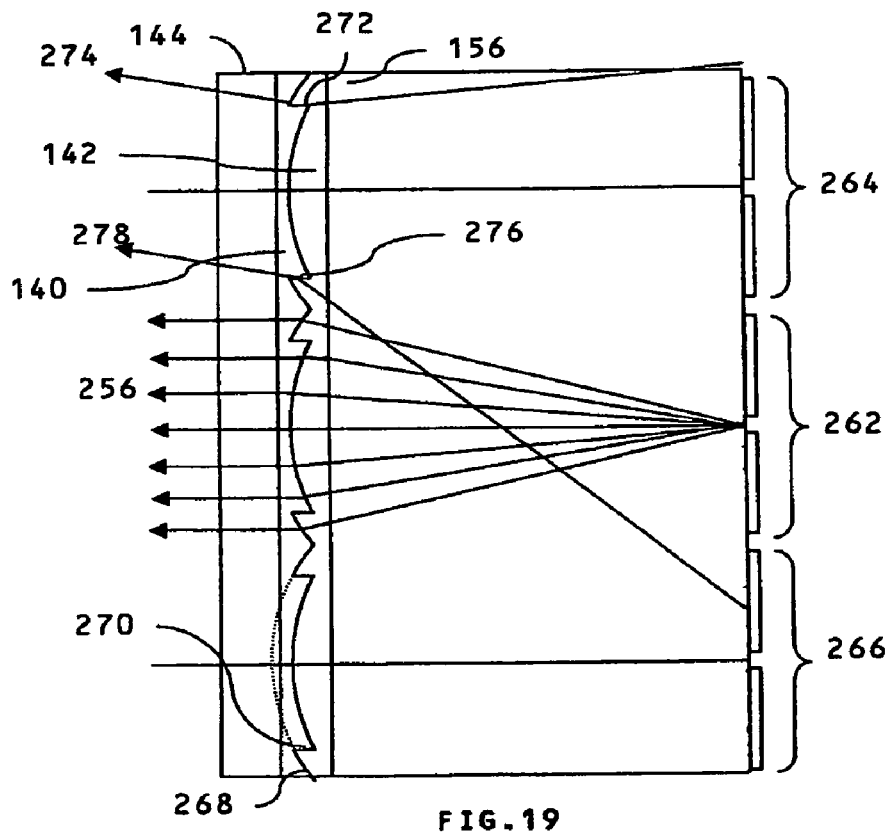
Figure 20:
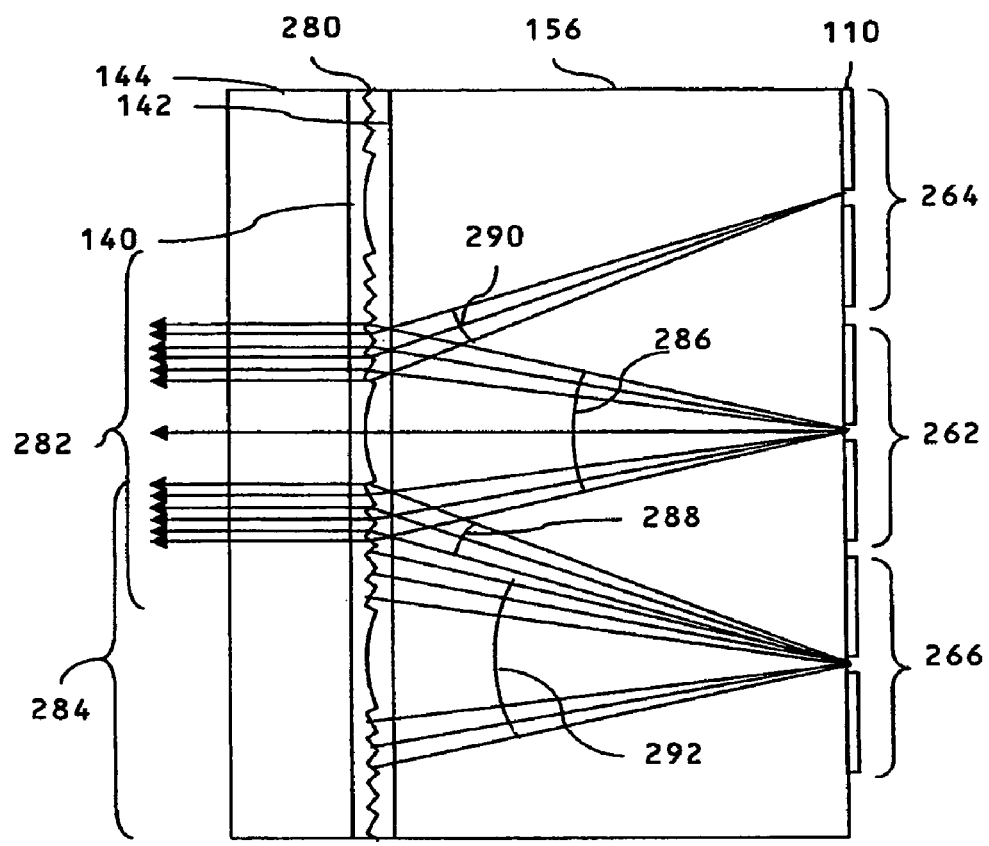
Figure 23:
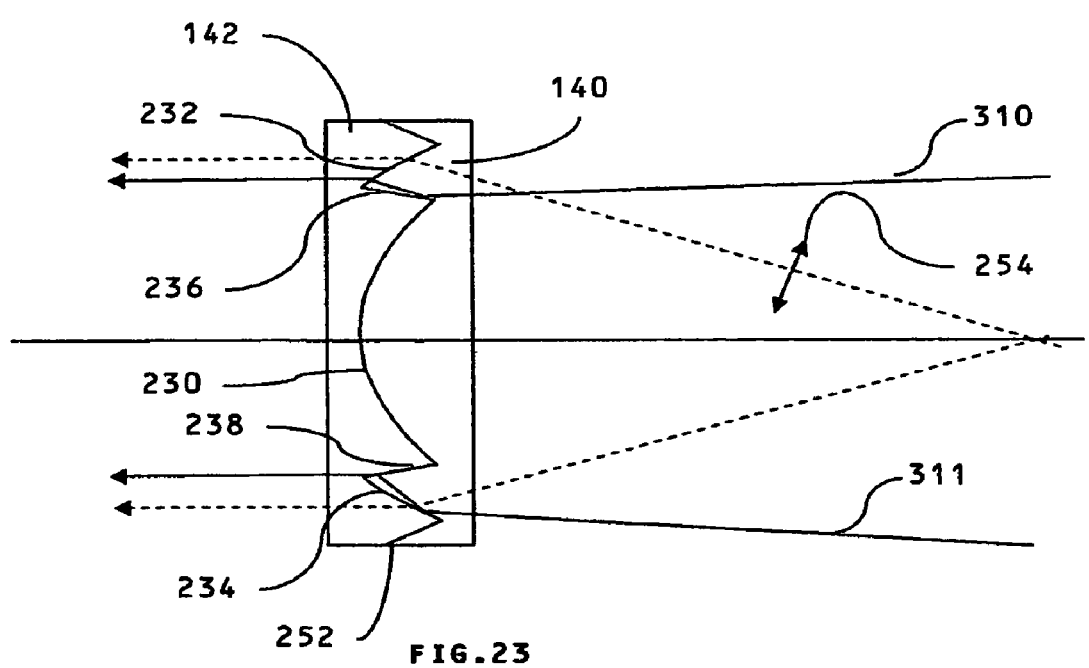
Figure 26:
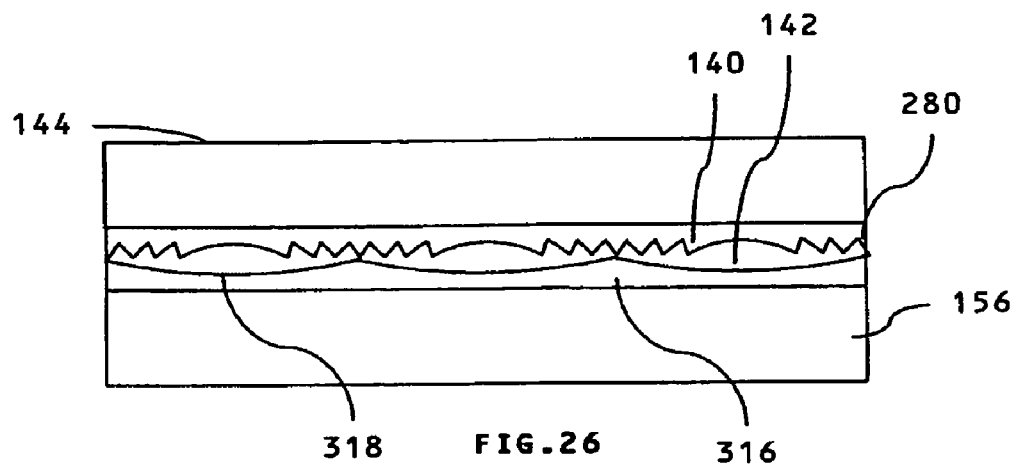
Figure 28:
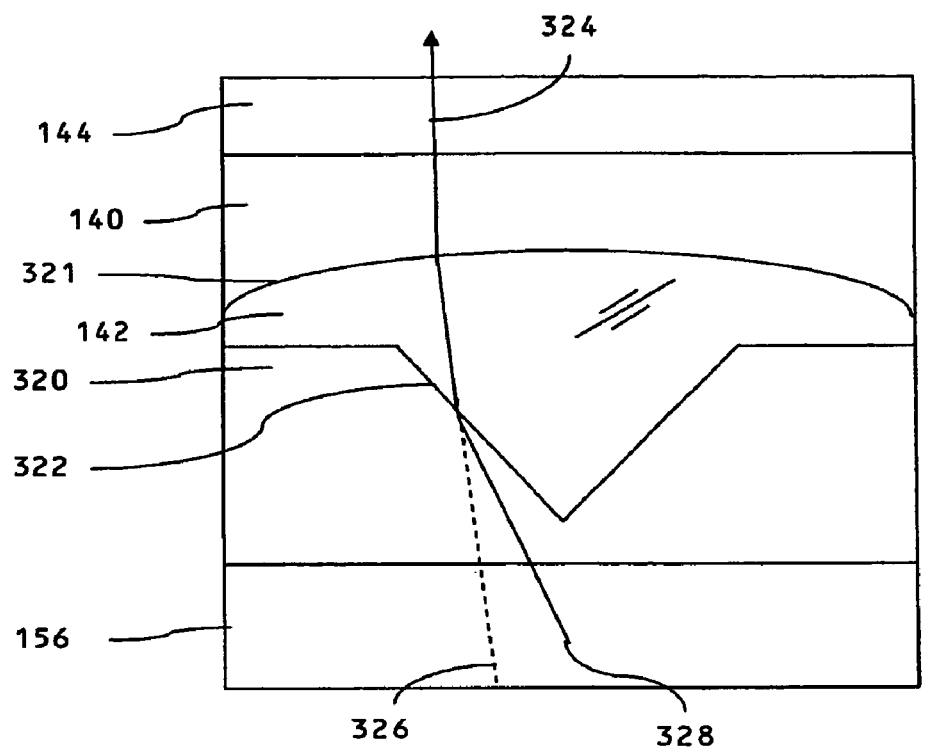
Figure 29:
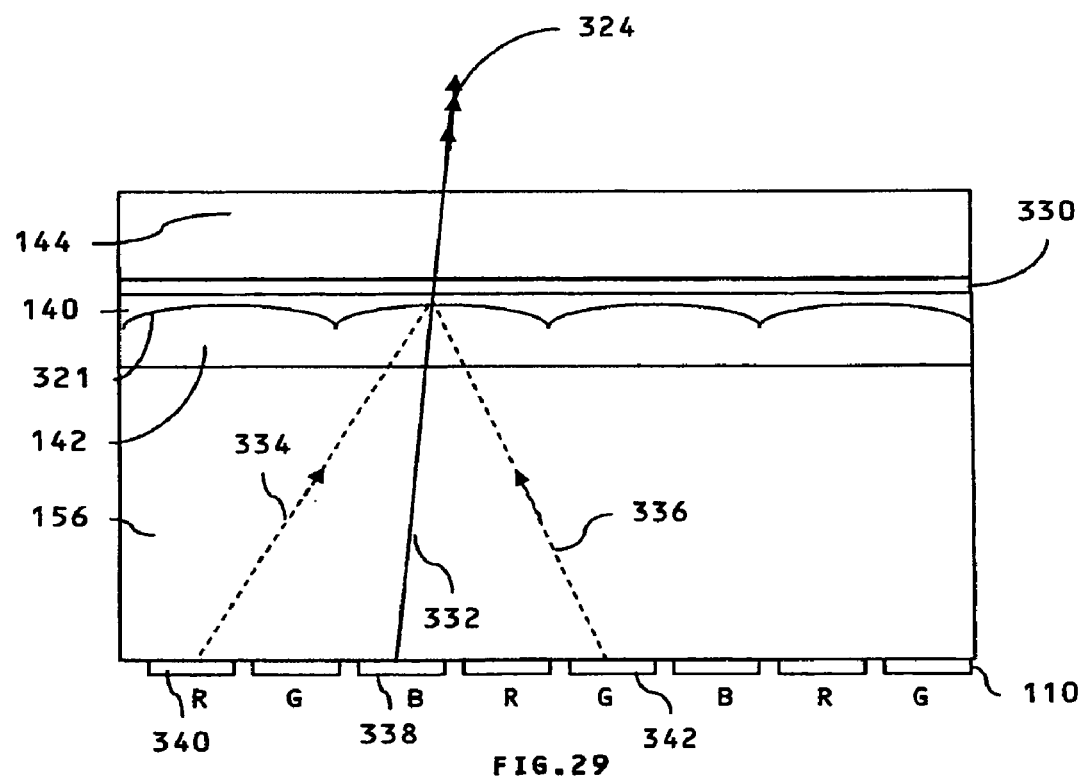
Figure 30:
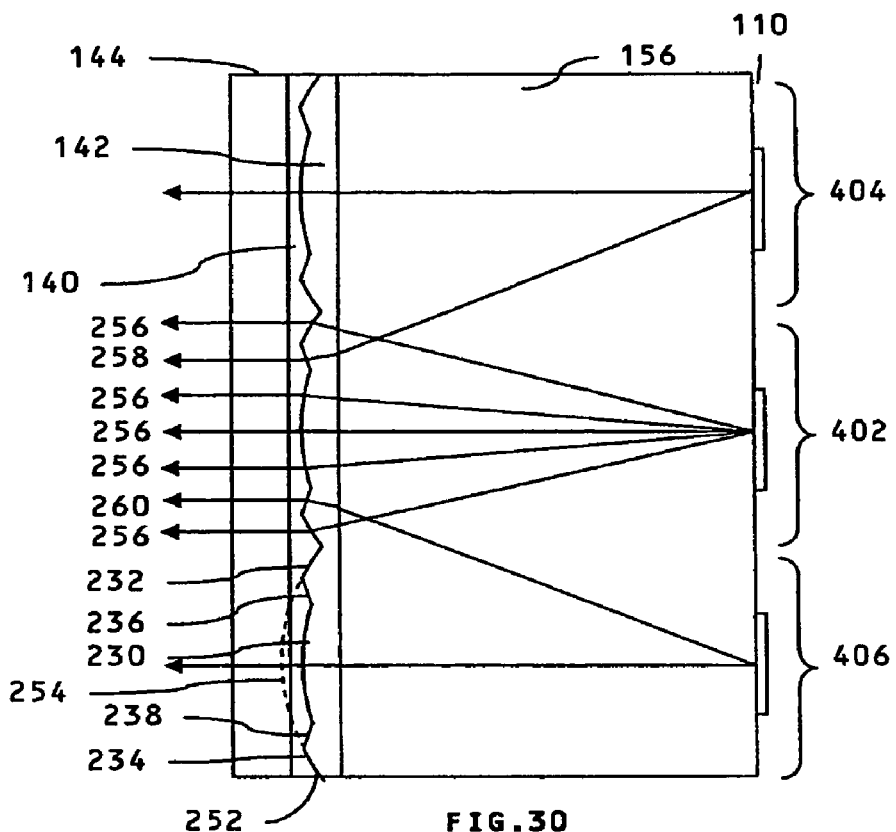

Embodiments of the present invention will now be described, by way of non-limitative example, with reference to the accompanying drawings, in which:

FIG. 1a shows the generation of apparent depth in a 3D display for an object behind the screen plane;

FIG. 1b shows the generation of apparent depth in a 3D display for an object in front of the screen plane;

FIG. 1c shows the position of the corresponding homologous points on each image of a stereo pair of images;

FIG. 2a shows schematically the formation of the right eye viewing window in front of an autostereoscopic 3D display;

FIG. 2b shows schematically the formation of the left eye viewing window in front of an autostereoscopic 3D display;

FIG. 3 shows in plan view the generation of viewing zones from the output cones of a 3D display;

FIG. 4 shows the ideal window profile for an autostereoscopic display;

FIG. 5 shows a schematic of the output profile of viewing windows from an autostereoscopic 3D display;

FIG. 6 shows the structure of a lenticular screen display;

FIG. 7 shows a prior art polarisation activated microlens display;

FIG. 8 shows a prior art polarisation activated microlens display;

FIG. 9 shows a prior art polarisation activated microlens display;

FIG. 10 shows a prior art polarisation activated microlens display;

FIG. 11 shows a prior art polarisation activated microlens display;

FIG. 12 shows the alignment of colour sub-pixels with respect to a lenticular screen;

FIG. 13 shows the appearance of one of the 3D images of FIG. 12;

FIG. 14 shows the generation of a colour 3D pixel;

FIG. 15 shows a graph of a known computational model for perceived contrast sensitivity against spatial frequency;

FIG. 16 shows the effect of higher green pixel luminance on the spatial luminance distribution of colour pixellated displays;

FIG. 17 shows a lens array of the invention and the variation of luminance across the lens array;

FIG. 18 shows a 3D display incorporating a lens array of the invention;

FIG. 19 shows a prior art Fresnel lens;

FIG. 20 shows further the operation of the lens array of FIG. 18;

FIG. 21 shows the structure of a mask for recording lens arrays;

FIG. 22 shows the recording of a master lens array;

FIG. 23 shows errors generated by total internal reflection in a lens array of the present invention;

FIG. 24 shows one structure of electrodes for an active lens of the present invention;

FIG. 25 shows a further structure of electrodes for an active lens of the present invention;

FIG. 26 shows a lens of the invention comprising multiple lens surfaces;

FIG. 27 shows the formation of the lens of FIG. 26;

FIG. 28 shows the use of a separate prism as a light deflecting element;

FIG. 29 shows the use of a hologram as a light deflecting element;

FIG. 30 shows a further display; and

Figure 31:
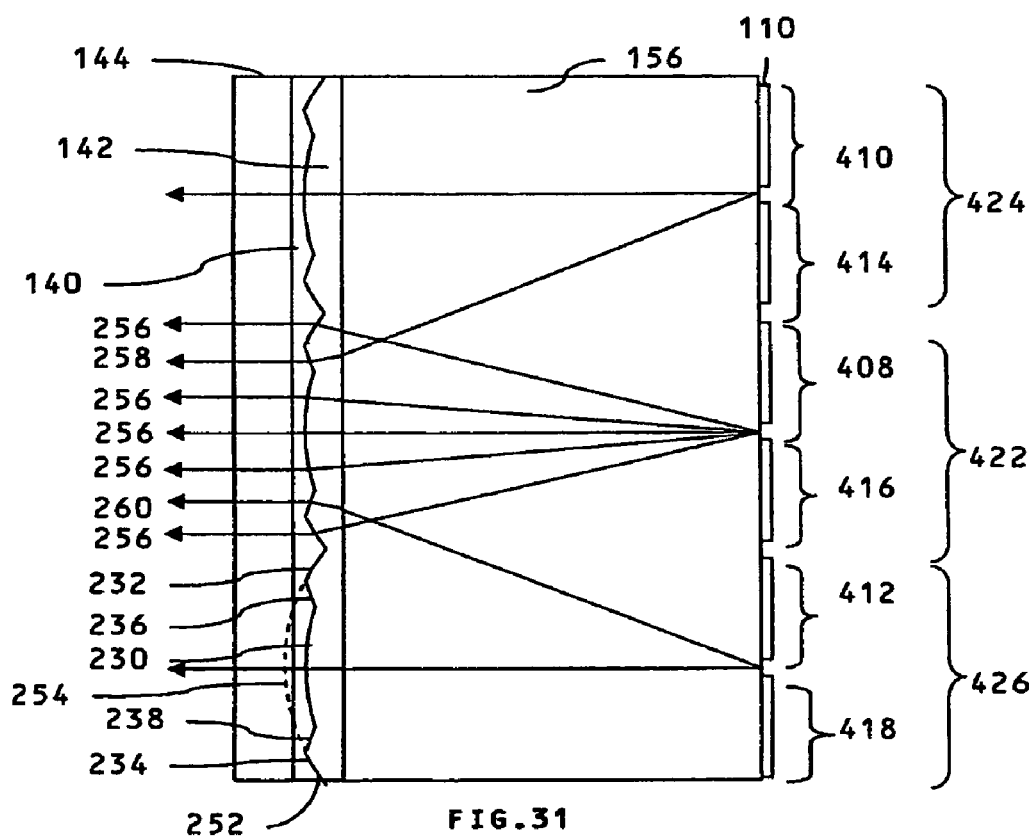

FIG. 31 shows a yet further display.

Figure 32:
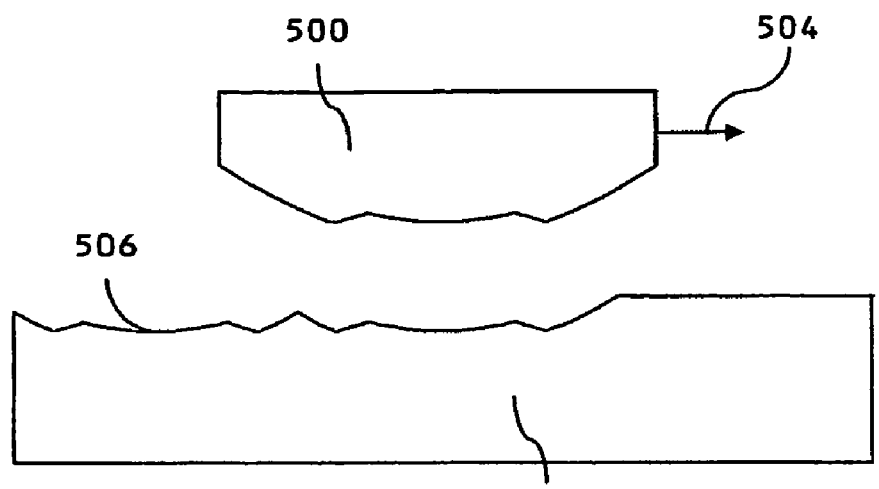
Figure 33A:
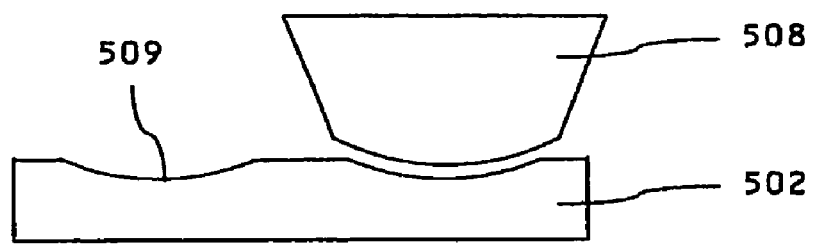
Figure 33B:
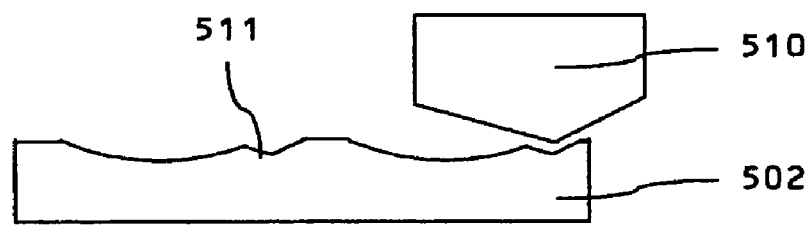
Figure 33C:
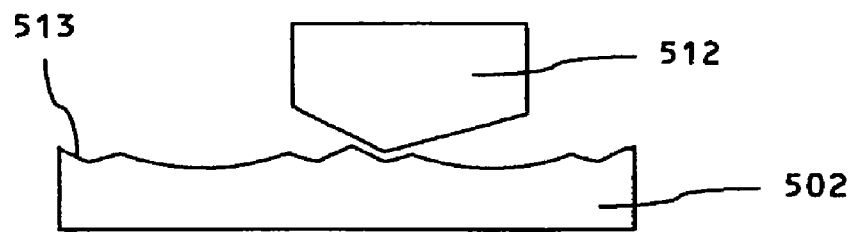
Figure 34:
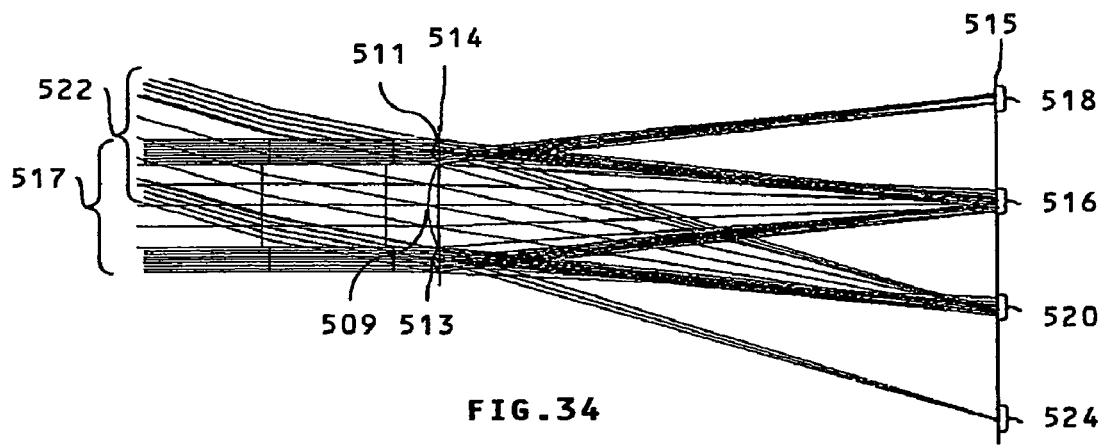
Figure 35:
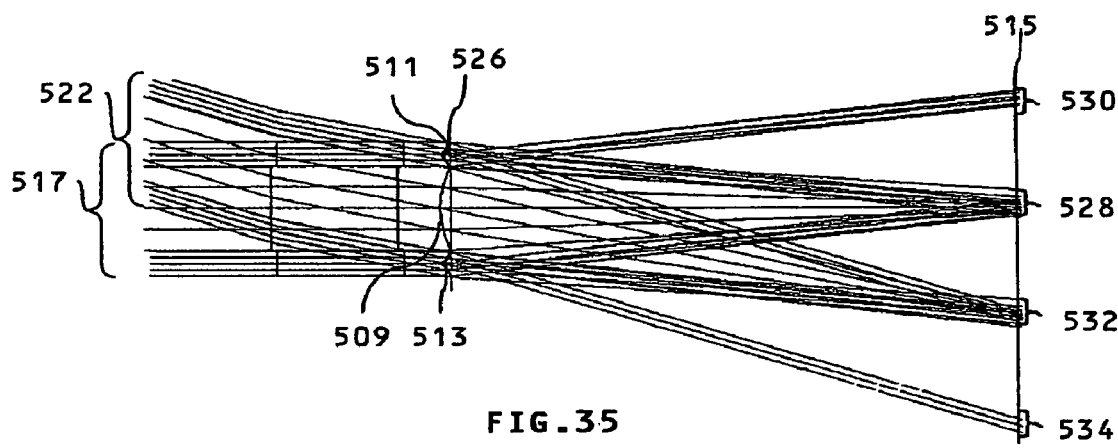
Figure 36:
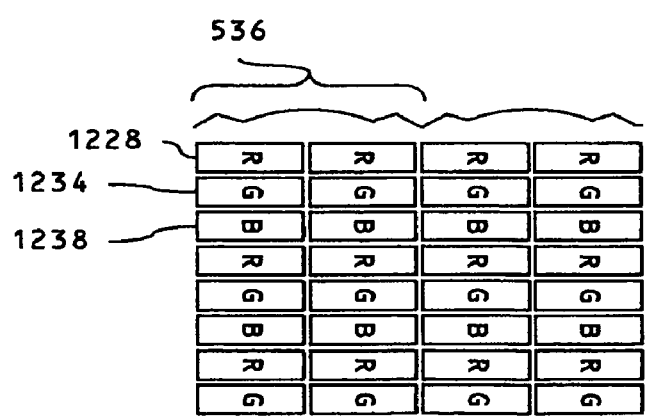

FIG. 32 shows one apparatus for diamond machining a tool;

FIG. 33 shows one further method for diamond machining a tool;

FIG. 34 shows a ray trace of a device incorporating curved lens surfaces;

FIG. 35 shows a ray trace of a device incorporating plane lens surfaces;

FIG. 36 shows the structure of a display incorporating colour pixels arranged in rows with respect to the lens position; and FIG. 37 shows an active lens of the invention incorporating a conductive polymer.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction The geometric microlens axis is defined as the line along the centre of the lens in the first linear direction, i.e. parallel to the direction of sweep of the edge. In a 2D-3D type display, the geometric microlens axis is vertical, so that it is parallel or at a slight angle to the columns of pixels of the display. In a brightness enhanced display as described herein, the geometric microlens axis is horizontal so that it is parallel to the rows of the pixels of the display.

FIG. 12 shows the well known 'stripe' pixel configuration used in many display types, comprising columns of red 1228, green 1234 and blue 1238 pixels. The lens array 1000 repeating substantially at a predetermined pitch equal to twice the pitch of the pixel columns (in fact slightly less for viewpoint correction) is shown in cross section while the pixels are shown in plan view for ease of explanation in the figures of this document. If a cylindrical lens array 1000 is placed over the surface of this pixel configuration then each eye of the observer will see half of the horizontal pixels. This is illustrated in FIG. 13 for the right eye image comprising columns of red 1002, blue 1004 and green 1006 image pixels. In this case, the horizontal gap 1008 between the pixels is substantially zero because the lenticular screen serves to distribute the light from the respective pixel across the whole of the aperture of the lens.

The use of colour pixels in a two view autostereoscopic display is shown in more detail in FIG. 14. The lens 1214 of the lens array 1208 serves to cover pixel columns 1228 and 1234. The column 1228 contains red right eye data and the column 1234 contains green left eye data. The pixels 1222 are imaged to the right eye by the lens 1214 and appear to fill the aperture of lens 1214. In the adjacent lens 1216, the blue pixel column 1238 is imaged to the right eye and the red pixel column 1230 is imaged to the left eye. Similarly for the lens 1218 the green pixel column 1236 is imaged to the right eye and the blue pixel column 1240 is imaged to the left eye.

In the 2D mode, a colour pixel 1200 is made from adjacent colour subpixels 1202, 1204 and 1206. However, the 3D image colour pixel is formed from pixels that have twice the spacing for example 1224, 1242 and 1207.

As shown in FIG. 13, the horizontal resolution of a conventional stripe image produced by attaching a parallax optic such as a lenticular screen or parallax barrier to a conventional stripe panel is half the full panel resolution. The disadvantage of this approach is that the stereo image may appear to contain aliasing artefacts, for example appearing to contain vertical stripes.

One origin of the appearance of these stripes may be due to the human contrast sensitivity function as shown for example in FIG. 15, taken from the relationship as described in J. L. Mannos, D. J. Sakrison, "The Effects of a Visual Fidelity Criterion on the Encoding of Images", IEEE Transactions on Information Theory, pp. 525-535, Vol. 20, No 4, (1974). This graph shows the variation of contrast sensitivity 200 against spatial frequency 202 of a luminance function. The luminance spatial frequency for a stripe panel is defined as the spatial frequency of the triplet of red, green and blue colour sub-pixels.

For a typical display using a stripe panel of pixel pitch 80 .mu.m, viewed from 400 mm, the spatial frequency of the green channel for example is 29 cycles per degree and is shown by the arrow 204. When a lenticular screen is added and the device is viewed in the 3D mode then the spatial frequency is halved to 14.5 cycles per degree indicated by the arrow 206. In this case, the contrast sensitivity function has increased from 0.2 to 0.8, close to the peak of the human contrast sensitivity function. Clearly this value can be reduced by increasing the distance of the observer from the display, but the image will be less easily viewed and so this approach may not be desirable.

FIG. 16 shows schematically the horizontal luminance function 217 in images with RGB stripe pixel patterns. An array of pixels containing red 208, green 210 and blue 212 data columns is shown. The overall colour balance of the combined image is set as a standard white. The equivalent photopic luminance 214 of the three channels against position 216 is shown below. The graph shows that the luminance perceived from the green pixels is greater than the luminance of the red and blue pixels due to the human photopic efficacy function. At high resolutions, the human visual system cannot resolve the separate luminance levels of the RGB pixels and so this luminance difference is not perceived and the image appears uniform. However, if the pixel resolution falls as is the case with the half horizontal resolution stereo image, then the difference between the luminance of the red and blue pixels and the luminance of the green pixel may become apparent. The brighter green pixel columns may thus be seen as interspersed by dimmer red and blue columns, causing stripes to appear in the stereo image. Such a stripe appearance would be visible irrespective of the pixel shape on the display. Thus, even a perfect pixel with no gap between the pixels would be expected to show stripiness at this resolution.

A directional display apparatus which is an embodiment of the invention will now be described. First, the schematic arrangement of lenses and pixels will be described with reference to FIG. 17. The directional display apparatus has a similar arrangement to the known configuration illustrated in FIG. 14, except as follows.

The directional display apparatus comprises a spatial light modulator having an array of pixels 1003 and a lens array 1001 consisting of an array of lenses which repeat substantially at a predetermined pitch. In this specification, the term "lens" is used to refer to a section of the lens array 1001 at the predetermined pitch, that is the repeating unit of the structure of the lens array 1001. As described in more detail below, each lens of the lens array 1001 has regions 230-238 which have different optical effects.

Each lens of the lens array 1001 serves to direct light from a first pixel column 1005 in to a first (right eye) viewing window and a second pixel column 1007 into a second (left eye) viewing window. Additionally, light from the adjacent colour sub-pixel 1009 is directed in to the first viewing window and light from the adjacent colour sub-pixel 1011 is directed to the second viewing window, as illustrated in FIG. 17. A lens array 1001 is shown schematically in the upper part of FIG. 17, and is positioned over an array of RGB stripe pixels to provide a two view autostereoscopic display. FIG. 17 shows six lenses 223-228 of the lenses of the lens array 1001. For the right eye window, lenses 223 and 224 overlay green pixels, lenses 225 and 226 overlay blue pixels and lenses 227 and 228 overlay red pixels, respectively.

Each lens of the lens array has the same structure illustrated in FIG. 17 for a single lens 225.

In particular, the lens 225 has three first regions 230, 232, 234 which serve to collect light from the pixels aligned with the respective lens and direct it to the first zeroth lobe window. This is equivalent to the lens 1216 in FIG. 14 directing light from pixel column 1238 to the right eye zeroth lobe viewing window 40 in FIG. 3.

The lens 225 also has two second regions 236, 238 which are arranged alternately and contiguously with the first regions 230, 232, 234 and which serve to direct light from adjacent pixel columns aligned with the lenses 223, 227 on opposite sides of the given lens 225 to the same zeroth lobe window. Second region 236 has an imaging function which is substantially the same as the first regions of the adjacent lens 223 on one side, that is equivalent to the lens 1216 of FIG. 14 directing light from pixel column 1228 to the right eye zeroth lobe window 40. In contrast, in a standard lens array, the lens 1216 would direct substantially all of the light from pixel column 1228 to window 39 of the +1 lobe 46. Similarly, second region 238 has an imaging function which is substantially the same as the first regions of the adjacent lens 227 on the opposite side, that is equivalent to the lens 1216 of FIG. 14 directing light from the adjacent pixel column 1236 to the zeroth lobe viewing window 40. In contrast, in a standard lens array, the lens 1216 would direct substantially all of the light from pixel column 1236 to window 41 of the −1 lobe 48. The flow of information from aligned pixel to lens section with respect to an observer in window 40 is further indicated by arrows 240. Each adjacent lens serves to direct light both from underlying, aligned pixel columns and also from respective adjacent pixel columns to the zeroth order lobe.

Thus, the lens 225 is divided in to respective regions 230-238 of which the first regions 230, 232, 234 direct light from aligned pixel columns into nominal viewing windows and the second regions 236, 238 direct light from adjacent pixel columns into the same nominal viewing windows. It should be noted that the first respective regions 230, 232, 234 do not image light from the aligned pixel columns into the nominal viewing windows. In that the first regions 230, 232, 234 and the second regions 236, 238 direct light differently, the regions 230-238 could be thought of as being different "lenses" and the second regions 236, 238 could be thought of as being part of the same "lens" as the first regions 230,232, 234 of an adjacent lens, but herein the term "lens" is used differently and refers to the lens 225 as a whole, that is a section of the lens array 1001 at the predetermined pitch at which the lens array 225 repeats.

Typically the aperture of the second regions 236, 238 and the outer first regions 232, 234 is less than the aperture of central first region 230. Therefore, as an alternative, the second regions 236, 238 and the outer first regions 232, 234 (in general all the first regions except the central first region 230) may be formed as planar facets without any curvature, in which case they merely deflect the light into the respective viewing windows. Although the absence of focusing in principle alters the optical spot size, in practice there is little or no degradation of image quality because the spot size in the pixel plane, being substantially determined by the aperture, is typically close to the desired spot size. The benefits of the present invention are still obtained.

As shown in the graph of FIG. 17, the energy distribution 242 across the lens array is thus modified by adjacent pixel data. As the adjacent pixel columns contain different colour sub-pixels, this results in a mixing of colour data at each lens. For example the lens 225 for the right eye overlays a blue pixel with a luminance 246. The region 236 adds green light with a luminance 248 and the region 238 adds red light with a luminance 250 to the lens. As the size of the regions within the lenses is smaller than the visual acuity for the display parameters aforementioned, the colour data will appears to mix at the lens surface. This serves to increase the luminance frequency of the display, and so reduces the stripiness of the image.

The structure of one form of the directional display apparatus shown in FIG. 17, is shown in more detail in the cross-sectional view of FIG. 18.

The apparatus has a spatial light modulator which has the same structure as the known apparatus shown in FIG. 7 including a pixel layer 110 comprising an array of pixels 262, 264, 266.

The lens array has a structure which repeats substantially at a pitch equal to twice the pitch of the pairs of pixels 262, 264, 266, actually at a slightly lower pitch to provide viewpoint correction. The lens array comprises a birefringent material 142 and an isotropic material 140. For the polarization state that operates in the lensing mode of this embodiment, the refractive index of the birefringent material 142 in the lens is greater than that of the isotropic material 140. The lens surface 252 is shaped to provide the first regions 230, 232, 234 and the second regions 236, 238. A central first region 230 and first regions 232, 234 on either side comprise portions of a lens surface 255. The first regions 230-234 serve to direct rays 256 towards the centre of the zero order lobe from the centre of the pair of pixels 262 aligned with the lens in question. Due to viewpoint correction, the aligned pair of pixels 262 will directly underlie the lens in the middle of the display, but will be offset from the optical axis of the lens in regions towards the edge of the display. Arranged alternately with the first regions 230, 232, 234 of any given lens are second regions 236, 238 which have substantially the same imaging function as the first regions 230, 232, 234 of the respective adjacent lenses. Thus the second regions 236, 238 comprise surfaces inclined in the opposite sense to the adjacent first regions 230, 232, 234. Thus the second regions deflect the light so that region 236 serves to direct light rays 258 from adjacent pair of pixels 264 towards the centre of the zero order lobe, whereas region 238 serves to direct light rays 260 from adjacent pair of pixels 266 towards the centre of the zero order lobe.

Given that for the lens surface 252 the first and second regions 230-238 are substantially contiguous without any vertical facets between the first and second regions 230-238, the inclination of the second regions 236, 238 allows a thickness of the central first region 230 to be removed as compared to the lens surface 254. Thus a thickness reduction is achieved in a comparable manner to a Fresnel lens, as well known in the art, but without the presence of any vertical facets.

It can be seen, for example from FIG. 17 that such a structure advantageously reduces the visibility of stripiness in the operation.

Of particular advantage is that the structure can have the same sag as a standard lens with a single facet, but is thinner. In this case, a thinner lens uses less birefringent material 142 and is thus cheaper to manufacture. A thinner layer of liquid crystal material will also have reduced scatter with respect to the singlet lens. This means that the lens will have reduced visibility in brightly lit environments. Additionally, in configurations such as shown in FIG. 8, the contrast of the images will be enhanced because the polarisation state outputted from the display is less scattered by the lens and thus the analysed polarisation contrast is enhanced. Thus, such a lens array will have increased image quality compared to the standard singlet lens.

The regions 236 and 238 continue to function by directing light from adjacent pixel lobes in off-axis positions. Thus, for an observer moving to off-axis viewing windows, such as windows 36, 39 of FIG. 3, the lens will continue to produce multiple foci at various positions across its width. The aberrations of the lens may vary with viewing angle so that the size of the spot at the pixel plane may vary for each of the facets. The lens design may be compensated for an intermediate off-axis viewing position, rather than being tuned for the central viewing position, so as to increase the range of average lens performance for off-axis viewing positions.

In a further embodiment of the invention, the lens surface may be aligned with a stripe panel arranged so that rows of red 1228, green 1234 and blue 1238 pixels are positioned under each lens 536. Such a configuration does not rely on mixing of colours between adjacent lenses, as the colour pixel pitch is determined by the row pitch, and therefore unchanged in the 3D mode. However, such a configuration advantageously reduces the thickness of the lens, while each portion of the lens images light from the respective pixel column to the correct viewing window. Thus the lens structure does not serve to substantially increase the cross talk of the display, over a prior art lenticular array.

Conventional Fresnel lenses 268 use substantially vertical facets 270 between the lenses, as shown in FIG. 19. Such lenses have a similar advantage of reduced thickness for on-axis imaging such as for rays 256. In fact, the lenses of the present invention are substantially different to standard Fresnel lenses. The on-axis regions of the lens such as 232, 230, 234 of FIG. 17 are smaller than a conventional Fresnel lens, and the regions 236, 238 are larger. In a conventional Fresnel lens, this would disadvantageously reduce the efficiency of the lens and introduce errors in its imaging properties. However, in the lenses of the present invention the regions 236, 238 advantageously work in cooperation with the lens array and pixel array to produce appropriate imaging of light to the viewing windows for a range of field angles. In a conventional Fresnel lens, the additional imaging lens facets of the present invention would also serve to increase the thickness of the lens, and would therefore not be advantageous. The off-axis behaviour of Fresnel lenses is degraded compared to the present invention as used in a directional display apparatus. Light outputted along ray 274 will see a total internal reflection at the facet surface 272. Similarly, for light outputted along the ray 278, light will see a high angle refraction at the surface 276. The origin of the rays 274 and 278 is thus substantially different to the required view data. Such rays may cause patterning in the final image appearance, as they may contain data from incorrect views or black mask. Additionally, the contrast of these high angle rays may be reduced compared to the on-axis rays. Thus conventional Fresnel lenses do not serve to maintain image quality in the display. The visibility of the facets increases as the angle of observation of the lens increases, so that the artefact will appear to vary as the observer moves laterally with respect to the display surface. Thus the second regions of this invention serve to collect light for the same viewing windows as the first region when the lens is used in cooperation with a spatial light modulator to form a directional display.

The lens thickness may be further reduced by introducing more facets, as shown for example in FIG. 20, in which a total of seven primary facets and five intermediate facets are used.

Each of the intermediate facets is used to direct light from adjacent pixel column lobes to the zero order lobe. In effect, the intermediate facets form an extension of the adjacent lens element, as they have a common focus. As a result of the first regions 230-234 and the second regions 236, 238 being arranged alternately, adjacent lenses can thus be considered as being interleaved. Thus the lens array 280 can be considered as having lenses 282 and 284 that overlap. Lens 282 forms a ray bundle 286 focused on the pixel plane 110 in to pair of pixels 262, a ray bundle 288 focused on pair of pixels 266 and a ray bundle 290 focused on pair of pixels 264. The adjacent lens 284 has ray bundle 292 focused on its zero order lobe 266. However, the ray bundle 288 can be considered as being produced by the lens 284, having a common focus as the ray bundle 292. Thus, the lenses 282 and 284 can be considered as being interlaced, or interleaved.

The lens form may be timed to optimise the aberrations of the system. For example, the surface may be aspheric. The aperture size of the facets may be set so as to minimise diffractive spreading of the output spot. The height of the facet may be set to optimise the phase profile of the output illumination from the lens, thus minimizing spot size at the pixel plane.

The lens structure may be replicated in to a polymer material as well known in the art. The birefringent material may be added to the surface of the lens as described in WO-03/015424.

The birefringent material may be a nematic phase liquid crystal, a polymerisable liquid crystal, a liquid crystal gel or liquid crystal polymer composite. Alternatively, the lens may be an active lens in which the birefringent material is switched by application of an electric field for example.

The scatter in the lens will chiefly be produced in the birefringent material, rather than the isotropic material. Advantageously, the layer of the lens with a lower average thickness comprises the birefringent material. This layer is the lower index side of the lens for the imaging function. Thus, to minimise the scatter of the lens, the isotropic material should have a refractive index which is substantially the same as the higher of the birefringent material refractive indices.

Advantageously, the use of the interlaced lens structures of the present invention allows the use of higher refractive index materials while maintaining low levels of scatter. Thus, the power of the lens may be increased to allow a higher numerical aperture device. Such a lens is particularly useful for displays with increased number of views. For example, a two view display based on a panel with a 50 .mu.m colour sub-pixel pitch will require a separation of the lens to the pixel plane of 590 .mu.m to give a 500 mm nominal viewing distance and 65 mm windows. With a material birefringence of 0.18, this requires a lens of curvature of approximately 90 .mu.m, giving a sag of 15 .mu.m. The average layer thickness is 10 .mu.m for an internal liquid crystal lens (in which the birefringent material is thickest at the centre of the lens), or 5 .mu.m for an external liquid crystal lens (in which the birefringent material is thickest at the edge of the lens).

If the number of views is doubled so as to increase the viewing freedom of the display, then the radius required to maintain the spot size is smaller than half of the lens pitch. Thus, a higher birefringence material is required which allows an increased radius of curvature, but increases the lens scatter. For a birefringence of 0.24, a lens radius of 125 .mu.m is acceptable, so that a singlet sag of 50 .mu.m with an average layer thickness of 35 .mu.m for an internal liquid crystal lens or 15 .mu.m for an external liquid crystal lens. A three facet lens would have a maximum thickness of less than 26 .mu.m, giving an average LC thickness of less than 17 .mu.m, or less than 9 .mu.m for an external birefringent lens structure. Thus, advantageously, much higher aperture lenses can be achieved by allowing the use of higher index materials in significantly thinner layers.

FIG. 23 shows that some spurious rays may be generated by total internal reflection within the lens structure. The ray 310 incident on the region 236 at angles greater than the critical angle in the medium will reflect at the surface, falling on the region 232, where it can be directed to the zero order lobe of the display. As the origin of the ray 310 is not necessarily from the desired pixel, then this can generate cross talk, or unwanted luminance variations for a moving observer. Similarly, rays 311 incident on the lens region 234 may reflect and be imaged by the region 238.

It is generally desirable that these rays are not present at least for on-axis viewing position. Therefore, the tilt of any of the surfaces should be less than the on-axis ray direction at the lens. For example, in the four view case with 50 .mu.m pixels and 590 .mu.m thickness glass and a three facet lens, the maximum ray angle in the glass is of the order of 12 degrees.

Thus, the surface should have a tilt to the vertical of at least 12 degrees. Typically, the surface has an angle of 18 degrees or greater, so the surface should not interfere with the input beam for 6 degrees off-axis in the material, equivalent to a viewing freedom of 9 degrees in air, or +/−80 mm at the nominal viewing distance. The reflectivity will start to switch on after this point, so that the energy in the artefact will increase. However, the central viewing position will advantageously have a low level of the artefact In order to increase the critical angle, it is desirable that the indeces of the material at the interface are as large as possible for a certain index step.

For angles less than the critical angle, some reflection of the incidence light will occur at the interface. The polarisation state in the plane of incidence will generally have a lower amplitude than the polarisation state orthogonal to the plane of incidence. Therefore, it is desirable that the lensing polarisation state is in the plane of incidence. This means that in FIG. 23, the material 142 is desirably birefringent and the material 140 is isotropic with a refractive index substantially the same as the extraordinary refractive index of the birefringent material. Thus, the birefringent material may be aligned parallel to the long axis of the lens structure 252, and the polarisation state 254 for the lens effect is in the plane of incidence. Thus, the amplitude of reflection at the surfaces is reduced compared to the alternative system.

An example ray trace for one type of lens that uses spherical faceted surfaces is shown in FIG. 34. A faceted lens surface 514 comprises a central spherical portion 509 and two facet surface pairs 511, 513. On-axis rays 517 are incident on the lens surface 514 and are imaged to spots 516, 518 and 520 at the pixel plane 515. The on-axis spot comprises light from the central spherical portion 509 and one facet of each of the two facet pairs 511, 513 as described elsewhere in the application. The other facets image light to spot 518 and 520, coincident with the central spot of the adjacent lens (not shown). In this case, the facet surface pairs have spherical surface profiles, and blurring of the spot is due to chromatic aberration in the lens. As the facets are substantially incoherent, intensity of the spot at the pixel plane can be derived from an intensity addition of light from each of the facets.

The lens is also shown to function for imaging of light from the centre of the first lobe, as shown by ray directions 522. In this case, the spherical lens portion images light to spot 520, while the facet surface pairs image light to spots 516, 524. In this case, chromatic aberration effects are not shown, so the spot 524 appears to be smaller than the spot 518.

In the case that the facet surface pairs 511, 513 have planar surfaces, the angle of the planar surface is set to approximate the tilt of the equivalent curved surface, such that the spot falls at the appropriate position at the pixel plane as described elsewhere. The size of the spot at the pixel plane may be substantially the same as the width of the facet. Small increases in the spot size will be produced by diffraction at the aperture of the facet The facet width should advantageously be of similar size to the size of the eye spot imaged by the spherical portion of the lens at the pixel plane. This is illustrated for the raytrace of FIG. 35. On-axis light is image to spots 528, 530, 532 and off-axis light to spot 534. As the facet is plane, the spots can be seen to blur somewhat, but the overall size of the central spot 528 is little changed. This is particularly true as the relative area of the facets is small compared to the central spherical region.

The size of the spot from the lens may also be set to be larger than one pixel width. For example, the lens may have a pitch substantially equal to six times the pixel width, and the spot may be equal to three times the pixel width. The central pixel may be considered as being the aligned pixel in this case.

Further diffractive alignment structures may be incorporated on the surface of the lens. These may be used to align the liquid crystal material on the polymer lens surface and may be incorporated into the same mold as used to form the lens structure in the polymer material. Diffractive alignment structures typically have dimensions similar to optical diffraction structures. However, the structures do not rely on diffraction to provide alignment of the birefringent material.

Advantageously, this invention allows a diffractive alignment layer to be formed on the master tool with greater ease than for a lens with a single facet. The master tool for the lens structure may be formed as described previously. A photoresist layer may then be applied to the surface of the master tool and illuminated with a grating structure, for example by interference of laser beams, or by illumination through a photomask comprising the appropriate structure. The illuminating pattern grating will have a limited depth of focus. As the thickness of the structures of this invention are lower than for lenses with a single facet, it is easier to set the surface within the depth of focus of the illuminating pattern. Therefore, advantageously, grating alignment structures may be formed more conveniently on the lens structures of this invention than for a lens with a single facet. Diffractive alignment allows reduced fabrication costs for the birefringent lens, as it does not require an additional alignment layers to be added and processed on the surface.

The aperture of the facets of the Fresnel lens will form a diffracting aperture for the light transmitted to the observer. This may create a reduction in the performance of the viewing windows, by increasing the levels of cross talk for example.

The lenses may be active lenses in which the birefringent material 142 is switched by application of an electric field as shown in FIG. 24 applied to transparent electrodes 312 and 314 formed from for example formed from Indium Tin Oxide. The electrodes may be formed on the substrates 144,156 for example or the electrode 312 may be formed on the surface of the polymer material 140 which is shaped to form the lens array 280, as shown in FIG. 25. This has the advantage that the thickness of dielectric across which the field is applied is reduced, although variations in the thickness of the layer may cause regions of different switched liquid crystal and therefore disclinations in the switched or unswitched state. The disclinations may result in degradation of image performance, for example increased lens scatter. Advantageously, the active lenses of the present invention are thinner than the prior art lenses, and thus require a lower voltage to be applied than lenses with a single facet surface. Additionally, the lens form may be optimised to minimise electric field variations across the lens surface for electrodes that are positioned either between the polymer and birefringent material or for electrodes that are positioned on either side of the polymer and birefringent materials. This may advantageously provide faster and more uniform switching of the active lens. Additionally, such a lens may advantageously exhibit fewer disclinations and thus higher optical quality than a single facet lens.

Alternatively as illustrated in FIG. 37 the replicated polymer material 538 may additionally comprise a conductive material so that the field can be applied directly to the polymer, and thus the field dropped across the birefringent material 142 can be reduced. Advantageously, the lenses of the current invention are thinner than a lens with a continuous surface (a single facet lens), while minimising display crosstalk. Therefore, less material is required to be used, and the transmission of the conductive polymer material may be increased.

The lenses of the invention may incorporate two imaging surfaces, as shown in FIG. 26 for example. The birefringent lens 142 may be formed between first 142 and second 316 isotropic materials. The faceted lens array 280 may be formed on the first isotropic material while the second surface 318 may be a singlet surface. A singlet surface advantageously may be used in cooperation with the facets of the lens. The facet angles are compensated to take into account the singlet surface 318 so that they continue to collect light from adjacent pixel lobes. Such an arrangement advantageously allows more optical power to be incorporated in the lens and thus the thickness of the birefringent material in the lens can be further reduced. Additionally, materials can be chosen to reduce chromatic aberration of the lens.

Figure 27A:
Figure 27B:
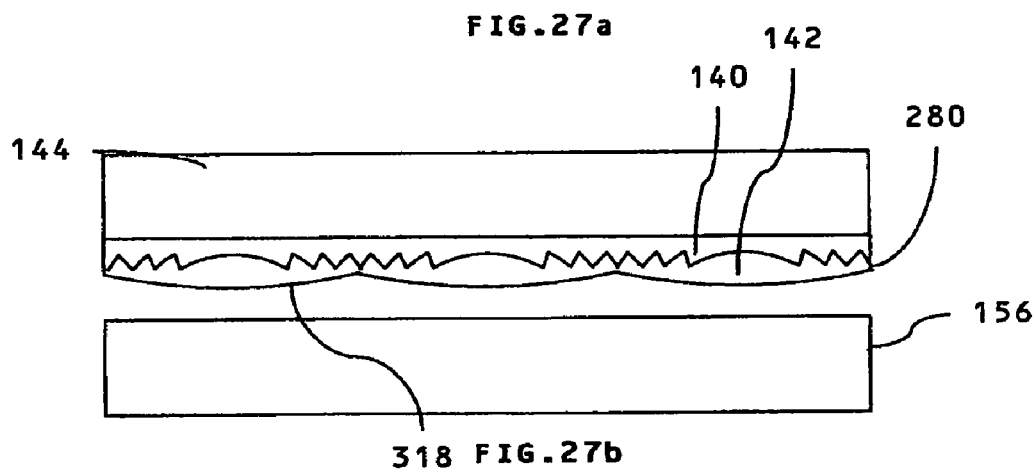
Figure 27C:
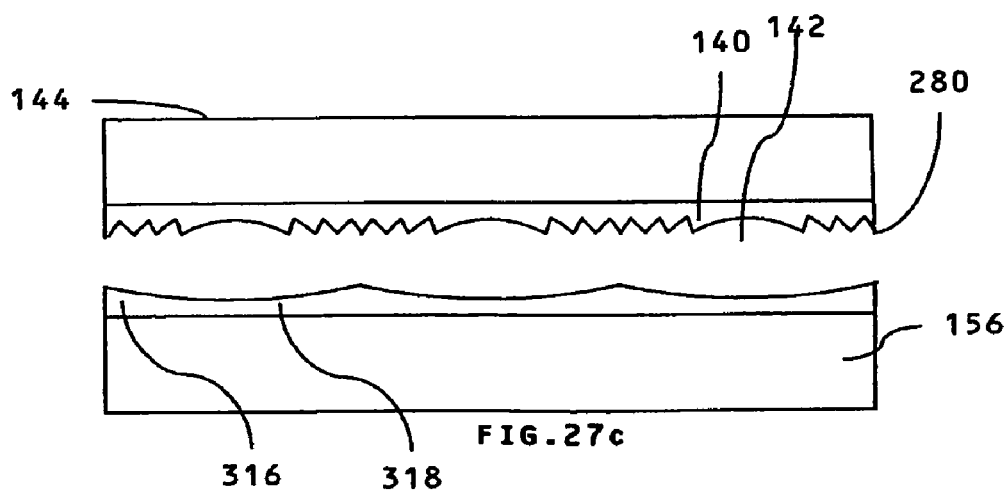

Such a lens may be formed as shown in FIG. 27 for example. FIG. 27a shows the formation of a first isotropic surface material 140 on the substrate 144. A birefringent material such as a UV curable liquid crystal is applied to the surface, with suitable alignment layers, and cured in contact with a tool comprising the second microstructure surface 318. The tool may also comprise alignment layers such as diffractive alignment layers to orient the birefringent material appropriately. The device may then be aligned to the substrate 156 as shown in FIG. 27b and the gap filled with the second isotropic material 316. Alternatively, as shown in FIG. 27c, the gap between two isotropic microstructures may be filled with the birefringent material 142.

The invention is of particular advantage for active lens systems in which the reduced thickness of the birefringent material enables operation at a lower voltage. The transparent electrode in this case may be at formed on the microstructured interface between the birefringent and isotropic materials from for example Indium Tin Oxide. The electrode function may also be provided by a conductive dopant to the isotropic material, or the material may itself be conductive for example conductive polymer.

In the embodiments described above, the shape of the lens surface in the second region effectively deflects light from adjacent pixels aligned with a lens adjacent a given lens to be directed by the given lens into the same viewing windows as the pixels aligned with the given lens. In another embodiment of the invention, a separate light deflecting element is provided in the form of a separate prism element as shown in FIG. 28 for example. The lens structure 321 comprises a refractive surface, for example between an isotropic material 140 and a birefringent material 142. A second isotropic material 320 is arranged with a prism structure 322 aligned to the lens structure. Light rays in the prism region pass along direction 328 corresponding to a pixel in an adjacent pixel lobe of the display, whereas an observer in the window plane receives light rays 324 which appear to have passed along ray direction 326 from the pixel plane. Thus, in the prism region of the display, the image is mixed between adjacent pixels. Such a configuration advantageously does not require a faceted lens structure, as the deflection element is incorporated as a separate structure. The lens is thus easier to master with high precision. The prism structure 322 may comprise more than one prism across the surface of the lens. The prism may be formed in a separate material to the lens. However, the structure shown in the embodiment will advantageously be switched off if the lens is switched off for example by modifying the orientation of the liquid crystal material 142 in the gap by applying an electric field, or by changing the polarisation of light propagating through the cell.

A further embodiment of the invention is illustrated in FIG. 29. As a separate light deflecting element, a hologram element 330 is placed close to the aperture of the lens array 321. The hologram serves to deflect a proportion of the light from adjacent pixel columns of the same view towards the observer. Thus light from the central blue pixel 338 is passed through the hologram, whereas light 334 from the adjacent pixel 340 of the same view data as pixel 338 is deflected towards the observer along direction 324. Similarly light 336 from green pixel 342 is deflected along direction 324. Thus, the light from adjacent pixel columns of the same view data is deflected to the observer. The mixing of view data light reduces the stripiness of the display. The hologram 330 may comprise a volume transmission hologram for example. The hologram may comprise more than one layer for separate deflection of red, green and blue light beams. The hologram may have substantially the same deflection angle over the area of the display. The hologram may operate over the entire aperture of the lens, or may be formed over part of the lens aperture. The hologram may advantageously require low tolerance alignment with respect to the lens.

The lenses can be conveniently formed using known manufacturing techniques. A replication tool may be formed in a photoresist material, for example by the steps of exposing a photoresist layer with a greyscale mask such as a HEBS mask available from Canyon Materials Inc. Alternatively, the mask may be a half-tone mask under which a photoresist layer is scanned, as shown in FIG. 21 for example. The mask 294 comprises barrier regions 296 and aperture regions 298. The shape of the aperture regions means that in the scan direction 300, the exposure of the photoresist varies with lateral position. Such a scanning arrangement is shown in FIG. 22. The mask 294 is illuminated by a UV light source 302 producing a substantially collimated beam 304. The photoresist layer 306 on a substrate 308 is scanned along direction 300 with respect to the mask.

The faceted lens structure may be formed by scribing for example as shown in FIG. 32. In scribed elements a polished cutting tool 500 such as a diamond cuts a profile 506 into a material 502 which is generally a metal such as copper or nickel. The diamond translates out of the page in the cutting direction, and laterally as shown by the arrow 504 at the end of each cut line or cut cycle.

However, for example in the case of cylindrical lenses with a single cutting axis, the scribe tool can also be formed from a composite tool comprising more than one cutting element, as shown in FIG. 33 for example. The first cutting element 508 produces a spherical surface profile 509 for the centre of the lens. The second cutting element 510 produces a first pair of facets 511 and the third cutting element 512 produces a second pair of facets 513.

The tools 508, 510 and 512 may be incorporated into a single cutting head so that the surfaces are machined substantially together, with a short longitudinal offset of the surfaces, so that the surface is cut at substantially the same time. Alternatively, the surfaces can be cut in sequence, so that the cutting head makes a pass over the surface of the material 502 at least once for each cutting tool.

The tools 508, 510 and 512 may be made in conventional manner by polishing diamond. In particular, the surface of each of the facet surface pairs 511, 513 may be spherical, or may be conveniently be substantially planar. Planar surfaces have the advantage that they are easier to machine into the cutting tool using standard techniques.

A replication tool can be formed from the cut tool as is well known in the art. In this way, replicated polymer elements can be formed from the tool with low cost and good reproducibility of lens structures.

The mask may incorporate features to minimise the diffraction between the mask an the photoresist layers, so as to optimize the shape of the features formed. This may be achieved by incorporation of additional features in the binary mask shape to compensate for the diffraction. For example, some apodisation of the aperture created by some small greyscale features in the mask may reduce Fresnel diffraction artefacts.

The greyscale photoresist structure may be modified after recording by Chemically Assisted Ion Beam Etching, so that the feature height of the structure may be amplified in order to achieve the desired sag values.

The greyscale photoresist structure may have a replicating tool formed on its surface for example by means of electroplating, as well known in the art.

In the above arrangements, the spatial light modulator is transmissive, but the invention is equally applicable to displays with any other type of spatial light modulator including an emissive or reflective SLM.

In the above arrangements the lens array directs light into viewing windows arranged to provide a 3D autostereoscopic display. However, the present invention is equally applicable to lenses which direct light into viewing windows for other purposes, for example to provide a multi-user display, a controlled viewing region display or an enhanced brightness display, an example of which will now be described.

The structure of further type of lens comprising multiple imaging regions is shown in FIG. 30. The lens comprises a birefringent material 142 and an isotropic material 140. For the polarization state that operates in the lensing mode of this embodiment, the refractive index of the lens 142 is greater than that of the isotropic material 140. The lens surface 252 contains three areas. The central portion 230 and side portions 232,234 comprise portions of a lens surface 254, in which a thickness has been removed to create a lens as previously described. The portions 230-234 serve to direct rays 256 towards the zero order lobe from the pixel region 402. As described previously, the pixel region 402 will underly the lens in the middle of the display, but will be offset from the optical axis of the lens in regions towards the edge of the display. In this case the pixel regions 402, 404, 406 show a single pixel aperture as, for example, in an OLED display operating in Enhanced Brightness mode as described in WO-03/015424.

FIG. 31 differs from FIG. 30 in that the pixel regions 424, 422 and 426 now comprise separate pixel apertures 410-418. Pixel 422 comprises a reflective pixel aperture 408 and a transmissive pixel aperture 416. Pixel 424 comprises a reflective pixel aperture 410 and a transmissive pixel aperture 414. The shape, relative proportion of transmissive and reflective apertures and number of apertures within a pixel may vary according to each design. This embodiment is advantageously used in Enhanced Brightness mode as described in WO-03/015424.

The invention claimed is:

1. A directional display apparatus comprising:
   a spatial light modulator comprising an array of pixels; and
   a lens array having a structure which repeats substantially at a predetermined pitch,
   wherein the lens array is arranged such that each respective section of the lens array at said pitch is formed to provide:
      a plurality of first lens facets operable for directing first light beams from at least one pixel aligned with the respective section into at least one nominal viewing window; and
      a plurality of second lens facets operable for directing second light beams from at least one adjacent pixel aligned with a section adjacent the respective section into the same at least one nominal viewing window, wherein each of the first lens facets is arranged alternately with each of the second lens facets to form a continuous lens surface, the first and second lens facets are all of no vertical facets, wherein all the light beams outputted from all the lens facets are substantially in parallel with one another.

2. A directional display apparatus according to claim 1, wherein the lens array is a birefringent lens array.

3. A directional display apparatus according to claim 2, wherein the birefringent lens array is a passive element and the directional display apparatus further comprises a switchable polariser arranged to control the polarisation component of all the light beams passing through the lens array and output from the directional display apparatus.

4. A directional display apparatus according to claim 2, wherein the birefringent lens array is an active element which is switchable to control the effect of the lens array.

5. A directional display apparatus according to claim 2, wherein the directional display apparatus is arranged such that each respective section is also operable for directing light from at least one adjacent pixel aligned with sections adjacent the respective section on opposite sides of said respective section into the same at least one nominal viewing windows.

6. A directional display apparatus comprising:

a spatial light modulator comprising an array of pixels; and a lens array having a refractive structure which repeats substantially at a predetermined pitch, wherein the lens array is arranged such that each respective section of the lens array at said pitch is formed to provide:

at least one first region operable for directing light from at least one pixel aligned with the respective section into at least one nominal viewing window; and at least one second region operable for directing light from at least one adjacent pixel aligned with a section adjacent the respective section into the same at least one nominal viewing window, wherein the first region is arranged alternately with the second lens region to form a continuous lens surface, the first and second regions are both of no vertical facets.

7. A directional display apparatus according to claim 6, wherein the lens array is a birefringent lens array.

8. A directional display apparatus according to claim 7, wherein the birefringent lens array is a passive element and the directional display apparatus further comprises a switchable polariser arranged to control the polarisation component of all the light beams passing through the lens array and output from the directional display apparatus.

9. A directional display apparatus according to claim 7, wherein the birefringent lens array is an active element which is switchable to control the effect of the lens array.

10. A directional display apparatus according to claim 7, wherein the directional display apparatus is arranged such that each respective section is also operable for directing light from at least one adjacent pixel aligned with sections adjacent the respective section on opposite sides of said respective section into the same at least one nominal viewing windows.

* * * * *

UNITED STATES PATENT AND TRADEMARK OFFICE
CERTIFICATE OF CORRECTION

PATENT NO.         : 7,796,318 B2                                              Page 1 of 1
APPLICATION NO.    : 12/128064
DATED              : September 14, 2010
INVENTOR(S)        : Woodgate et al.

It is certified that error appears in the above-identified patent and that said Letters Patent is hereby corrected as shown below:

On the Title Page, Item (63) on Related U.S. Application Data, please replace the date of "Sep. 24, 2006" with "Sep. 24, 2004".

Column 1, line 7, immediately following "24," please delete "2006" and substitute --2004-- therefor (such that line 7 reads "24, 2004, which claimed the benefit of United Kingdom").

Signed and Sealed this
Twenty-eighth Day of December, 2010

David J. Kappos
*Director of the United States Patent and Trademark Office*